US009416859B2

(12) United States Patent
Iwaki et al.

(10) Patent No.: US 9,416,859 B2
(45) Date of Patent: Aug. 16, 2016

(54) HYDROSTATIC STEPLESS TRANSMISSION

(71) Applicant: Kanzaki Kokyukoki Mfg. Co., Ltd., Hyogo (JP)

(72) Inventors: Koji Iwaki, Hyogo (JP); Jun Matsuura, Hyogo (JP); Daisuke Murashima, Hyogo (JP); Tomoyuki Ebihara, Hyogo (JP); Minoru Kamada, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 630 days.

(21) Appl. No.: 13/863,843

(22) Filed: Apr. 16, 2013

(65) Prior Publication Data

US 2013/0269328 A1  Oct. 17, 2013

(30) Foreign Application Priority Data

Apr. 17, 2012  (JP) .................................. 2012-94294
Apr. 17, 2012  (JP) .................................. 2012-94295
Apr. 2, 2013  (JP) .................................. 2013-77241

(51) Int. Cl.
*F16H 39/14* (2006.01)
*F16H 39/00* (2006.01)

(52) U.S. Cl.
CPC ................ *F16H 39/00* (2013.01); *F16H 39/14* (2013.01)

(58) Field of Classification Search
CPC ......... F16H 39/00; F16H 39/14; F16D 31/02; F15B 7/005; F15B 7/008; F15B 7/02
USPC .......................................... 60/464, 487, 489
See application file for complete search history.

(56) References Cited

U.S. PATENT DOCUMENTS

| 2,151,415 | A | * | 3/1939 | Bennetch | ................ | F16H 39/14 60/437 |
| 3,131,539 | A | * | 5/1964 | Creighton | ............... | F16H 39/14 60/487 |
| 4,669,267 | A | * | 6/1987 | Greenhow | .............. | F16H 39/14 60/490 |
| 2006/0120884 | A1 | | 6/2006 | Nozaki | | |

FOREIGN PATENT DOCUMENTS

JP  2003-014111 A  1/2003
JP  2008-281180  11/2008

OTHER PUBLICATIONS

Extended European Search Report for Application No. EP 13 163 863.7 dated Aug. 5, 2013, four pages.

* cited by examiner

*Primary Examiner* — Nathaniel Wiehe
*Assistant Examiner* — Dustin T Nguyen
(74) *Attorney, Agent, or Firm* — Sterne, Kessler, Goldstein & Fox P.L.L.C.

(57) ABSTRACT

A hydrostatic stepless transmission ("HST") includes a center casing into which a plunger block of a hydraulic pump and a plunger block of a hydraulic motor are inserted. Plunger ports are open and aligned peripherally on an outer peripheral surface of each plunger block. A pair of main fluid passages of a closed fluid circuit fluidly connecting the hydraulic pump to the hydraulic motor are formed in opposite side portions of the center casing. Each of the main fluid passage includes peripheral grooves formed on an inner peripheral surface of the center casing so as to face the plunger ports of the respective plunger blocks, and includes an axial fluid duct formed to be interposed between the peripheral grooves. A bearing gap is provided between the inner peripheral surface of the center casing and the outer peripheral surface of the plunger block so as to cause a dynamic pressure action of fluid.

12 Claims, 25 Drawing Sheets

HYDROSTATIC STEPLESS TRANSMISSION

BACKGROUND OF THE INVENTION

1. Field of the Invention

The present invention relates to a hydrostatic stepless transmission (hereinafter, referred to as "HST") including a hydraulic pump, a hydraulic motor and a closed fluid circuit fluidly connecting the hydraulic pump to the hydraulic motor. Especially, the present invention relates to the configuration and arrangement of a center casing constituting the closed fluid circuit and supporting plunger blocks of the hydraulic pump and motor, and relates to configuration for forcibly supplementing fluid to the closed fluid circuit in correspondence to improvement of the configuration and arrangement of the center casing.

2. Related Art

In a conventional HST as disclosed in JP 2008-281180 A, a pump plunger block rotatably integrated with a pump shaft has a flat surface at which plunger ports in the pump plunger block are open, a motor plunger block rotatably integrated with a motor shaft has a flat surface at which plunger ports in the motor plunger block are open, and the flat surfaces of the pump and motor plunger blocks contact a flat surface of a common plate-shaped or block-shaped center casing (or a fluid duct member) so as to be slidable and rotatable relative to the center casing. Hereinafter, the flat surfaces of the pump and motor plunger blocks and the flat surface of the center casing, which relatively slidably contact each other, are referred to as "slide surfaces". The center casing is formed therein with a pair of main fluid passages constituting a closed fluid circuit fluidly connecting the pump plunger block to the motor plunger block. These main passages are open at the slide surface of the center casing so as to serve as an encased pump port and an encased motor port. When the slide surfaces of the pump and motor plunger blocks contact the slide surface of the center casing, the plunger ports in the pump plunger block are fluidly connected to the main fluid passages via the encased pump port, and the plunger ports in the motor plunger block are fluidly connected to the main fluid passages via the encased motor port.

The HST configured as mentioned above is often activated at a high speed or under a heavy load. During such a high speed or loaded activation of the HST, a problem causes that the pressure of hydraulic fluid flowing between the encased ports and the plunger ports becomes excessive so as to forcibly open a gap between the slide surfaces of the plunger blocks and the slide surface of the center casing, thereby leaking the fluid from the forcibly opened gap.

Further, the encased ports are normally kidney-shaped. The sizes of the kidney-shaped ports are limited by the size of the slide surface of the plunger blocks. As a result, total areas of the main passages in the center casing cannot be satisfactorily large, whereby the flow amount of fluid circulating in the main passages is reduced so as to reduce a speed of the flow, so as to increase a loss of hydraulic pressure of the fluid, and so as to cause noises. Especially, in a low temperature, the viscosity of hydraulic fluid may become excessively high so that the fluid cannot flow between the pump and motor plunger blocks, thereby hindering start of the HST.

Further, the area of the remaining external surface of the conventional center casing other than that contacting the plunger blocks is too small to be subjected to an enough air-cooling effect. In this situation, when the HST is operated at a high speed or under a heavy load, the hydraulic fluid is heated so as to lower its viscosity, thereby enhancing the leak of fluid.

Further, the shape and position of the conventional center casing are limited because it has to contact the slide surfaces of the plunger blocks. Therefore, the freedom of the positional relation between the pump shaft and the motor shaft is limited so as to limit the input and output directions of the HST. As a result, a design of an apparatus assembled with the HST is limited.

Further, each of the pump and motor shafts is stably supported at one end thereof via a bearing by a housing incorporating the hydraulic pump and motor and at the other end thereof via another bearing by the center casing. Such a configuration of supporting the pump and motor shafts increases the number of bearings and increases the size of the HST. Especially, when the pump and motor shafts are extended coaxially to each other, the HST becomes very long.

SUMMARY OF THE INVENTION

To solve the above-mentioned problems, the present invention is configured as follows: An HST of the invention includes a hydraulic pump, a hydraulic motor and a closed fluid circuit fluidly connecting the hydraulic pump to the hydraulic motor. The closed fluid circuit includes first and second main fluid passages interposed between the hydraulic pump and the hydraulic motor. The hydraulic pump includes a pump shaft, a first plunger block and plungers. The first plunger block is rotatably integrated with the pump shaft. Plunger chambers are formed in the first plunger block, and the plungers are axially reciprocally slidably fitted into the plunger chambers in the first plunger block. The hydraulic motor includes a motor shaft, a second plunger block and plungers. The second plunger block is rotatably integrated with the motor shaft. Plunger chambers are formed in the second plunger block, and the plungers are axially reciprocally slidably fitted into the plunger chambers in the second plunger block. The HST also includes a center casing into which the first and second plunger blocks are inserted so that the center casing includes an inner peripheral surface which has a portion facing an outer peripheral surface of the first plunger block and another portion facing an outer peripheral surface of the second plunger block. Plunger ports are formed in each of the first and second plunger blocks so as to be connected to the respective plunger chambers and so as to be open at an outer peripheral surface of each of the first and second plunger blocks. First and second encased fluid ducts are formed in the center casing so as to extend along the axial directions of the pump shaft and the motor shaft. First and third peripheral grooves are formed on the portion of the inner peripheral surface of the center casing facing the outer peripheral surface of the first plunger block. Second and fourth peripheral grooves are formed on a portion of the inner peripheral surface of the center casing facing the outer peripheral surface of the second plunger block. The first encased fluid duct is fluidly connected to the plunger ports of the first plunger block via the first peripheral groove and is fluidly connected to the plunger ports of the second plunger block via the second peripheral groove so that the first encased fluid duct and the first and second peripheral grooves constitute the first main fluid passage. The second encased fluid duct is fluidly connected to the plunger ports of the first plunger block via the third peripheral groove and is fluidly connected to the plunger ports of the second plunger block via the fourth peripheral groove so that the second encased fluid duct and the third and fourth peripheral grooves constitute the first main fluid passage.

The HST configured as mentioned above brings the following effects: During circulation of fluid in the closed fluid circuit, even if the HST is activated at a high speed or under a heavy load so as to increase the hydraulic pressure of fluid, the inner peripheral surface of the center casing is proof against an internal pressure so as to keep a constant gap between the inner peripheral surface of the center casing and the outer peripheral surface of each of the first and second plunger blocks. A wall of the center casing surrounding the first and second plunger blocks is radially wide so as to have a large sectional area in the axial direction of the pump or motor shaft. This sectional area is sufficiently large so that the number of the encased fluid ducts in the wall can be increased or the sectional area of each of the encased fluid ducts can be increased, thereby ensuring sufficiently large total sectional areas of the encased fluid ducts. Therefore, the flow amount of fluid circulating between the hydraulic pump and the hydraulic motor is increased so as to increase the flow of fluid, so as to reduce the loss of transmitted power, so as to suppress noises and so as to ensure a smooth start of activation of the HST in a low temperature.

In the HST, a bearing gap causing an action of dynamic pressure of fluid is provided between the inner peripheral surface of the center casing and the outer peripheral surface of each of the first and second plunger blocks so that the center casing fluidly supports the first and second plunger blocks.

The effect of the fluidal support using the dynamic pressure of fluid is to reduce load on mechanical bearings, thereby minimizing the mechanical bearings. Consequently, the plunger blocks can be supported by only the fluidal support without using the mechanical bearings, thereby reducing costs, reducing the number of parts, and improving assembility. Further, due to the minimization or elimination of the mechanical bearings, the plunger blocks can be minimized in the axial directions of the pump and motor shafts so as to minimize the HST. In the HST, abrasion and seizure of parts are reduced so as to prolong life of the parts, so as to improve the efficiency of power transmission and so as to reduce noises.

A dynamic pressure groove is provided on at least one of the outer peripheral surfaces of the first and second plunger blocks and the inner peripheral surface of the center casing so as to provide the bearing gap.

Therefore, due to the dynamic pressure groove on the outer peripheral surface of the first or second plunger block or the inner peripheral surface of the center casing, the bearing gap is provided to realize the fluidal support of the plunger block. The dynamic pressure grooves may be herringbone, may be formed in multi arc-shaped grooves or may be formed in any other shapes. The dynamic pressure grooves may be aligned in the peripheral direction or the peripheral alignment of grooves may be multiplied in the axial direction. Such various shapes or arrangements of the dynamic groove or grooves are conceivable so as to optimize the fluidal support of the plunger block.

A partition is provided in the center casing between the first and second plunger blocks, and end portions of the respective first and second plunger blocks toward the partition are provided with respective openings at end surfaces thereof facing the partition so as to supply pressurized fluid from the plunger chambers onto the partition.

Therefore, the partition supports the end portion of each of the first and second plunger blocks relatively slidably so as to receive a thrust load from the plunger block. On the other hand, the opening reduces the frictional resistance of the partition against the end portion of each of the first and second plunger blocks. Consequently, in the HST, abrasion and seizure of parts are reduced so as to prolong life of the parts, so as to improve the efficiency of power transmission and so as to reduce noises.

A bearing is interposed between the center casing and at least one of the first and second plunger blocks so as to correspond to radial and thrust forces generating in the at least one of the first and second blocks.

Therefore, the single bearing surely bears the plunger block generating the radial and thrust forces, thereby reducing the number of parts and costs and improving assembility in comparison with a case where a bearing corresponding to the radial force and another bearing corresponding to the thrust force are provided.

During the normal rotation of the motor shaft, the first main fluid passage is higher-pressurized and the second main fluid passage is lower-pressurized. A pressure balancing groove is branched from at least one of the first and second peripheral grooves so as to extend adjacent to at least one of the third and fourth peripheral grooves.

Therefore, during the normal rotation of the motor shaft, the pressure balancing groove introduces high-pressurized fluid from the higher-pressurized first or second peripheral groove to a portion of the inner peripheral surface of the center casing formed with the lower-pressurized third or fourth peripheral groove so as to press back the plunger block by the high-pressurized fluid even if the plunger block receives a counter force from a swash plate abutting against the plungers reciprocating in the plunger chambers in the plunger block and receives a hydraulic pressure caused by a differential pressure in the center casing between the higher-pressurized first main fluid passage and the lower-pressurized second main fluid passage. Consequently, the outer peripheral surface of the plunger block is prevented from contacting the inner peripheral surface of the center casing, whereby in the HST, abrasion and seizure of parts are reduced so as to prolong life of the parts, so as to improve the efficiency of power transmission and so as to reduce noises.

Shoes are provided on tips of the plungers projecting from each of the first and second plunger blocks and contact a swash plate, and a spring is provided disposed coaxially to each of the pump shaft and the motor shaft so that the shoes are pressed against the swash plate by a biasing force of the spring.

Therefore, the spring serving as a biasing member for pressing the shoes against the swash plate is disposed coaxially to each of the pump shaft and the motor shaft outside of the main fluid passages of the closed fluid circuit so that the existence of the biasing member does not hinder the hydraulic fluid flow in the closed fluid circuit. In this regard, in the conventional HST, springs are provided in respective plunger chambers in a plunger block so as to serve as the biasing member for pressing shoes against a swash plate. On the contrary, the spring coaxial to the pump or motor shaft dispenses with springs in the plunger chambers hindering fluid flow in the plunger chambers. Consequently, the closed fluid circuit stably supplies fluid to the hydraulic pump and motor so as to ensure a sufficient efficiency of power transmission by the HST. Also, it is further advantageous for reducing the number of parts and costs and improving maintenance ability.

The HST is provided with a valve unit. The valve unit includes a fluid duct block, a pair of charge check valves for supplying fluid to the respective first and second main fluid passages, and a pair of relief valves for draining excessively pressurized fluid from the higher-pressurized first or second main fluid passage. The fluid duct block incorporates the pair of charge check valves and the pair of relief valves.

Therefore, the pair of charge check valves for supplying fluid to the main fluid passages and the pair of relief valves for draining excessively pressurized fluid from the main fluid passages are assembled together as the single valve unit. These valves for controlling the pressure and flow of hydraulic fluid in the closed fluid circuit can be completely assembled with the HST only by attaching the valve unit to the HST. Consequently, the number of processes for producing the HST or for assembling the HST in a vehicle is reduced so as to reduce costs.

In the center casing, a first charge fluid duct is bored to be connected to the first encased fluid duct, and a second charge fluid duct is bored to be connected to the second encased fluid duct. In the fluid duct block, a pair of charge ports are provided to be connected to delivery ports of the respective charge check valves. The charge ports are connected to the respective first and second charge fluid ducts by attaching the fluid duct block to the center casing.

Therefore, the HST needs only the boring of the first and second charge fluid ducts in the center casing to ensure fluid ducts for supplying fluid to the closed fluid circuit in correspondence to the attachment of the valve unit to the HST, thereby simplifying the fluid duct structure in the HST and reducing the number of fluid ducts for controlling fluid in the closed fluid circuit, and thereby reducing the number of processes and costs for making the fluid ducts in the HST.

In the fluid duct block, each of the relief valves is connected to each of the charge ports so that the relief valve corresponding to the higher-pressurized first or second main fluid passage absorbs fluid from the higher-pressurized first or second main fluid passage via the corresponding charge port and is opened by operating the fluid as a pilot pressure to drain excessively pressurized fluid from the higher-pressurized first or second main fluid passage.

Therefore, the excessively pressurized fluid from the higher-pressurized main fluid passage is introduced into the fluid duct block via the charge ports and is supplied to the relief valve for draining the excessively pressurized fluid from the higher-pressurized main fluid passage. It means that, in the HST, the first and second charge fluid ducts in the center casing are also used to supply excessively pressurized fluid to the respective relief valves. In other words, no additional fluid duct has to be formed in the HST to introduce the excessively pressurized fluid to the relief valve. Consequently, the above-mentioned effect of reducing processes and costs is further remarkably realized.

The center casing is cylindrical so that the first and second plunger blocks are inserted into the center casing so as to continue to each other so that the pump shaft and the motor shaft are disposed coaxially to each other.

Due to this configuration, the HST is minimized in the radial direction of the pump shaft and the motor shaft. For example, the HST is mounted in a vehicle so as to orient axes of the pump and motor shafts in the fore-and-aft direction of the vehicle, free spaces in the vehicle above and below the HST and rightward and leftward from the HST.

These, further and other objects, features and advantages will appear more fully in the following detailed description with reference to attached drawings.

DETAILED DESCRIPTION OF THE INVENTION

Figure 1:
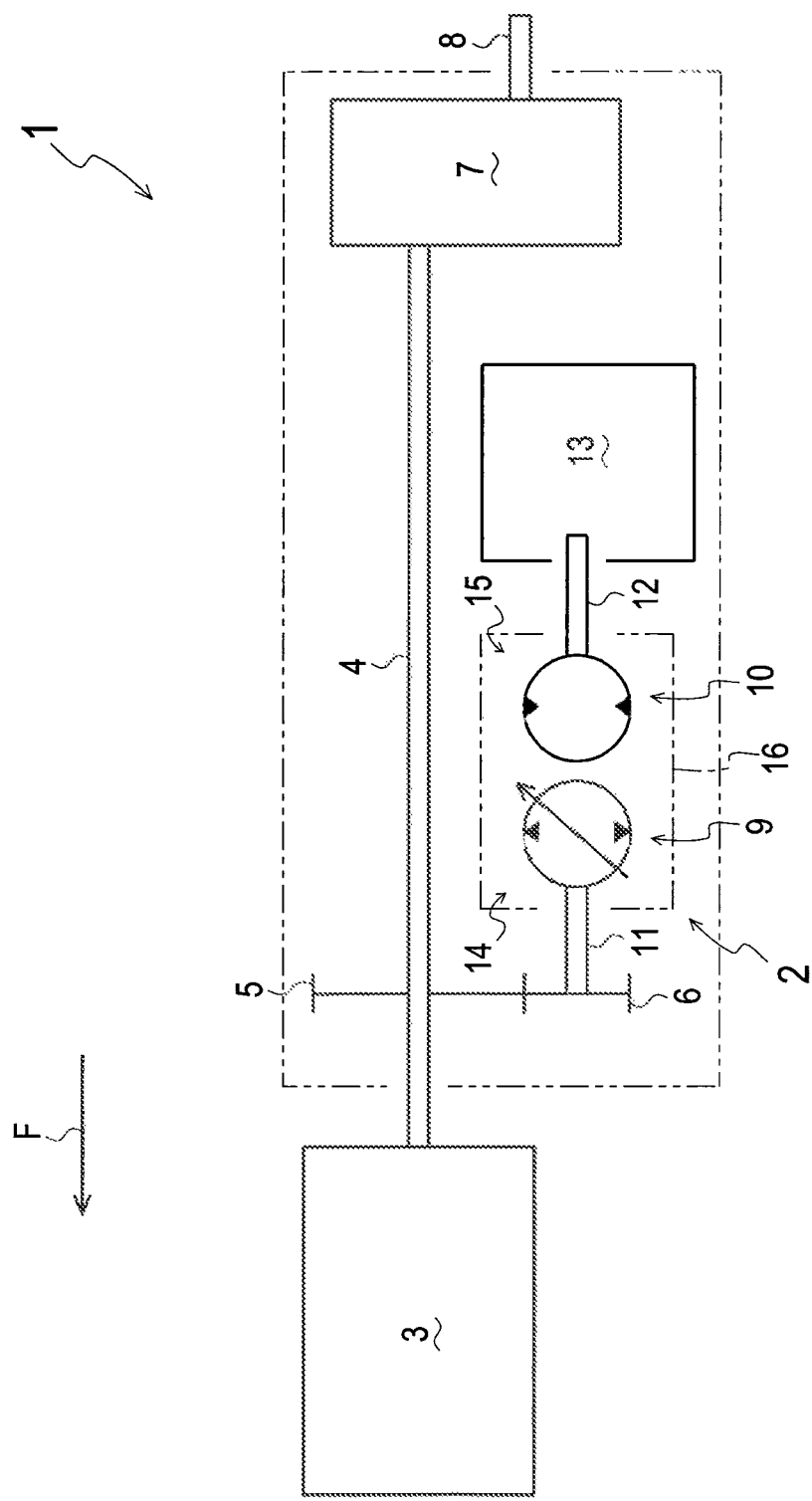
FIG. 1 is a diagram of a power transmission system in a working vehicle equipped with an HST 2 serving as a hydrostatic stepless transmission of the invention.
Figure 2:
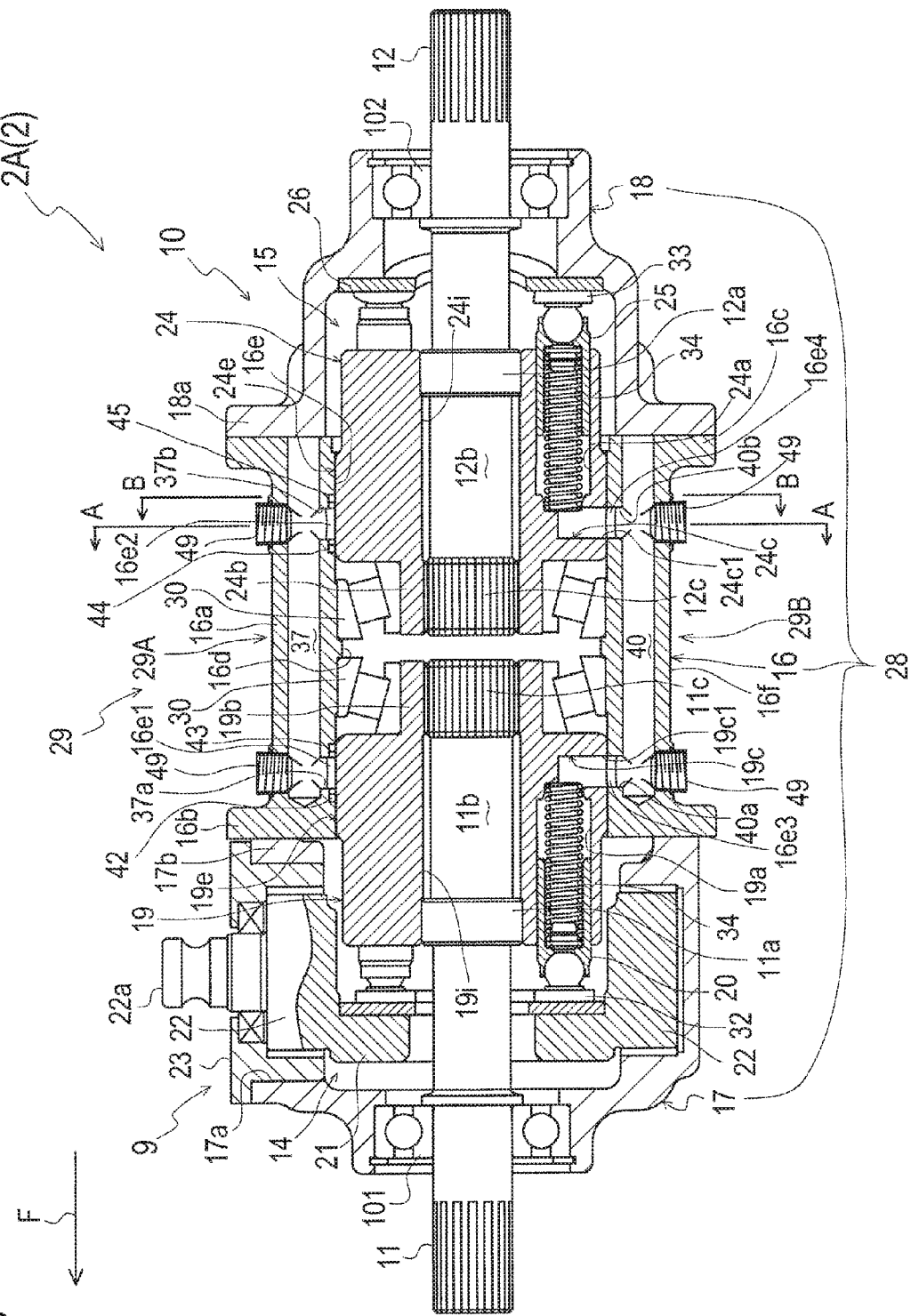
FIG. 2 is a sectional plan view of HST 2A serving as a first embodiment of HST 2.

Embodiments of the invention will be described in detail. In FIG. 1, an arrow F directs forward of a working vehicle 1 equipped with an HST 2 according to the invention. In FIG. 2 and other drawings, arrow F directs forward of HST 2. In other words, HST 2 is assumed to be arranged to have a hydraulic pump 14 and a hydraulic motor 15 so that hydraulic pump 14 is disposed forward of hydraulic motor 15. The following embodiments will be described on the assumption of this arrangement of working vehicle 1 and HST 2 unless any of the embodiments has a special or another arrangement of vehicle 1 or HST 2.

However, this arrangement is merely given for convenience of description. With regard to alternative arrangements of HST 2, for example, hydraulic motor 15 may be disposed forward of hydraulic pump 14, or the axial direction of pump and motor shafts 11 and 12 may be lateral or vertical in vehicle 1. Therefore, if any direction of any member or part, e.g., forward, rearward, rightward or leftward, is mentioned in the following description, it should be considered that the direction may be changed to correspond to a layout of vehicle 1 or arrangement of HST 2.

First, a power transmission system of working vehicle 1 will be described with reference to FIG. 1. Working vehicle 1 has an engine 3 serving as a prime mover. An output shaft of engine 3 is extended rearward so as to serve as a prime drive shaft 4. Prime drive shaft 4 is drivingly connected to a PTO shaft 8 via a PTO transmission 7. PTO shaft 8 transmits power from engine 3 to a working implement attached to working vehicle 1.

A drive gear 5 is fixed on a prime drive shaft 4. A pump shaft 11 of HST 2 is extended in the fore-and-aft direction of vehicle 1 so as to be disposed parallel to prime drive shaft 4. A driven gear 6 is fixed on a front end of pump shaft 11 and meshes with drive gear 5. Driven gear 6 is diametrically smaller than drive gear 5 so that gears 5 and 6 serve as a speed-increasing gear train for transmitting power from prime drive shaft 4 to pump shaft 11. Alternatively, gears 5 and 6 may have equal diameters so as to serve as an equal speed gear train, or gear 6 may be diametrically larger than gear 5 so that gears 5 and 6 serve as a speed-reducing gear train.

HST 2 is a main speed-shifting transmission. HST 2 has a motor shaft 12 disposed coaxially to pump shaft 11 so that motor shaft 12 transmits an output power of HST 2 to a transmission 13 disposed at the downstream side of motor shaft 12. Transmission 13 includes an unshown sub speed-shifting mechanical (e.g., gear-type) transmission mechanism drivingly connected to unshown rear wheels and front wheels.

Due to the above-mentioned structure, the rotary power outputted from engine 3 and speed-increased by gears 5 and 6 is inputted to HST 2. HST 2 mainly speed-changes the inputted rotary power. The transmission 13 auxiliarily speed-changes the rotary power outputted from HST 2 and transmits the auxiliarily speed-changed rotary power to the rear wheels and/or the front wheels.

HST 2 will be described. In this patent application, an HST 2A shown in FIGS. 2 to 7 (and HSTs 2Aa and 2Ab shown in FIGS. 8 and 9 serving as modifications of HST 2A) is configured to have plunger blocks 19 and 24 supported by taper roller bearings 30 so as to serve as a first embodiment of HST 2. An HST 2B shown in FIGS. 10 to 16 (and an HST 2Ba shown in FIG. 17 serving as a modification of HST 2B) is configured to fluidly support plunger blocks 19 and 24 without using taper roller bearings 30 so as to serve as a second embodiment of HST 2. Hereinafter, a common structure shared between HST 2A as the first embodiment and HST 2B as the second embodiment is described as a structure of "HST2".

Figure 5:
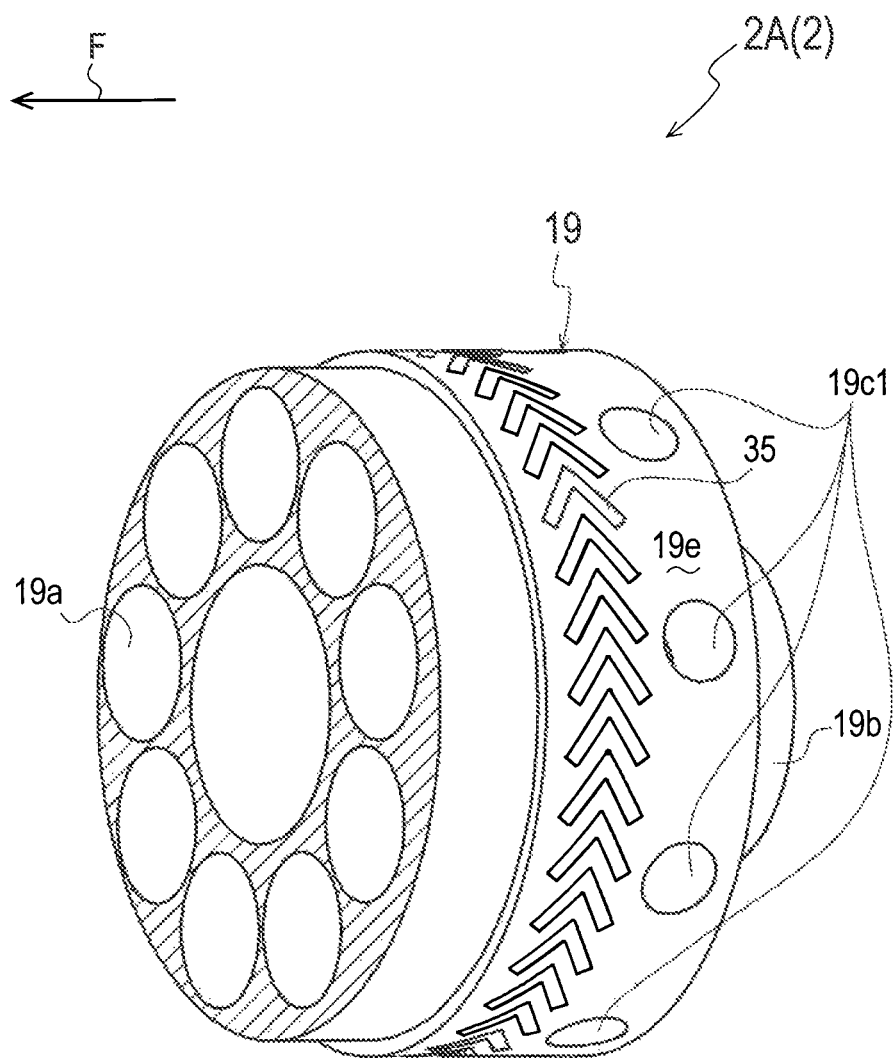
FIG. 5 is a perspective view of a plunger block 19 of a hydraulic pump 14 for HST 2A.
Figure 14:
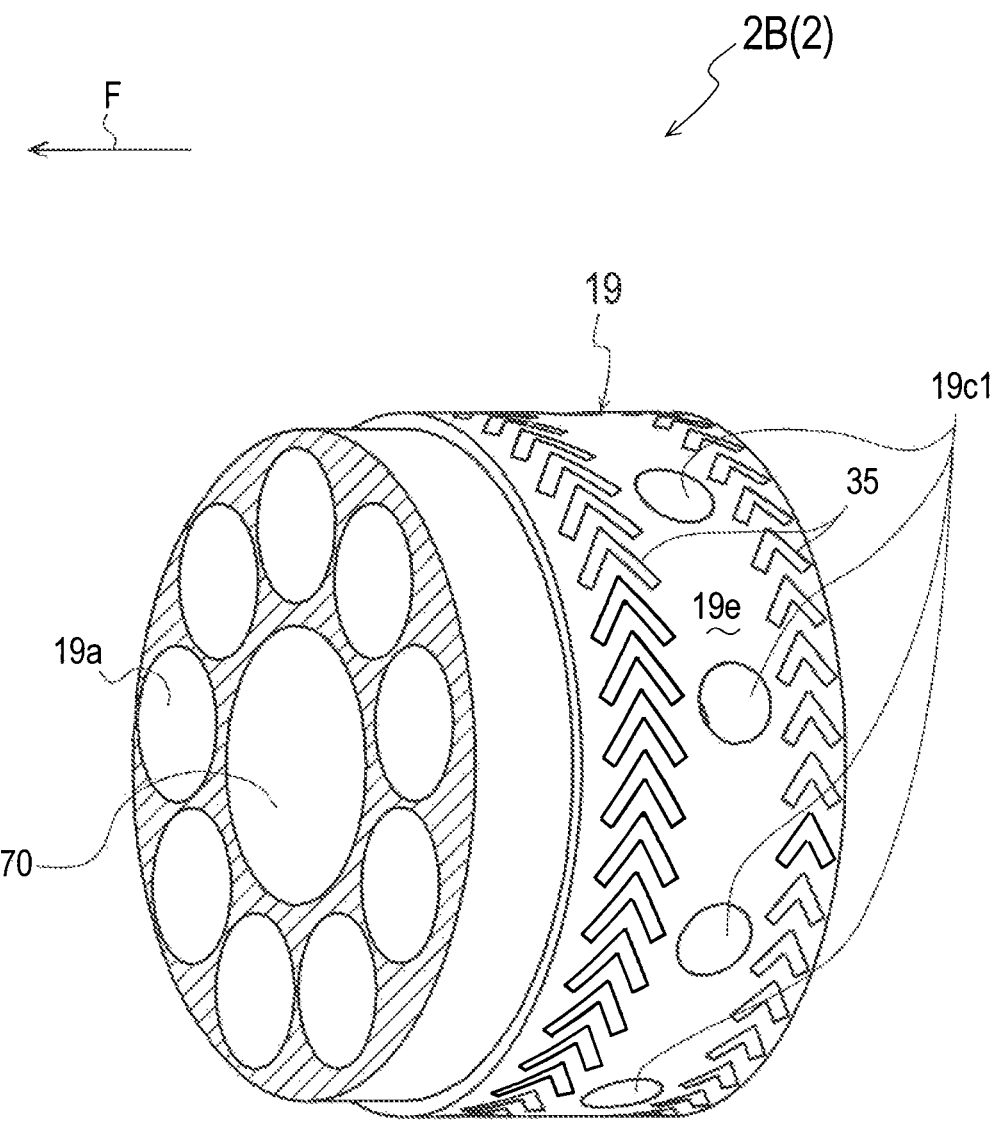
FIG. 14 is a perspective view of center casing 16 of hydraulic pump 14 for HST 2B.

Incidentally, arrangement of dynamic pressure grooves 35 on plunger block 19 of HST 2A as shown in FIG. 5 is different from that of dynamic pressure grooves 35 on plunger block 19 of HST 2B as shown in FIG. 14, for example. In this way, some members or parts each is provided in different forms or arrangements depending on difference of embodiments, however, each has a common function regardless of the difference of embodiments. Such a member or part is designated by a common reference numeral regardless of the difference of embodiments, and its description is basically unified. The form or arrangement difference of the member or part designated by the common reference numeral between or among different embodiments is described only if such a difference has to be described.

Figure 10:
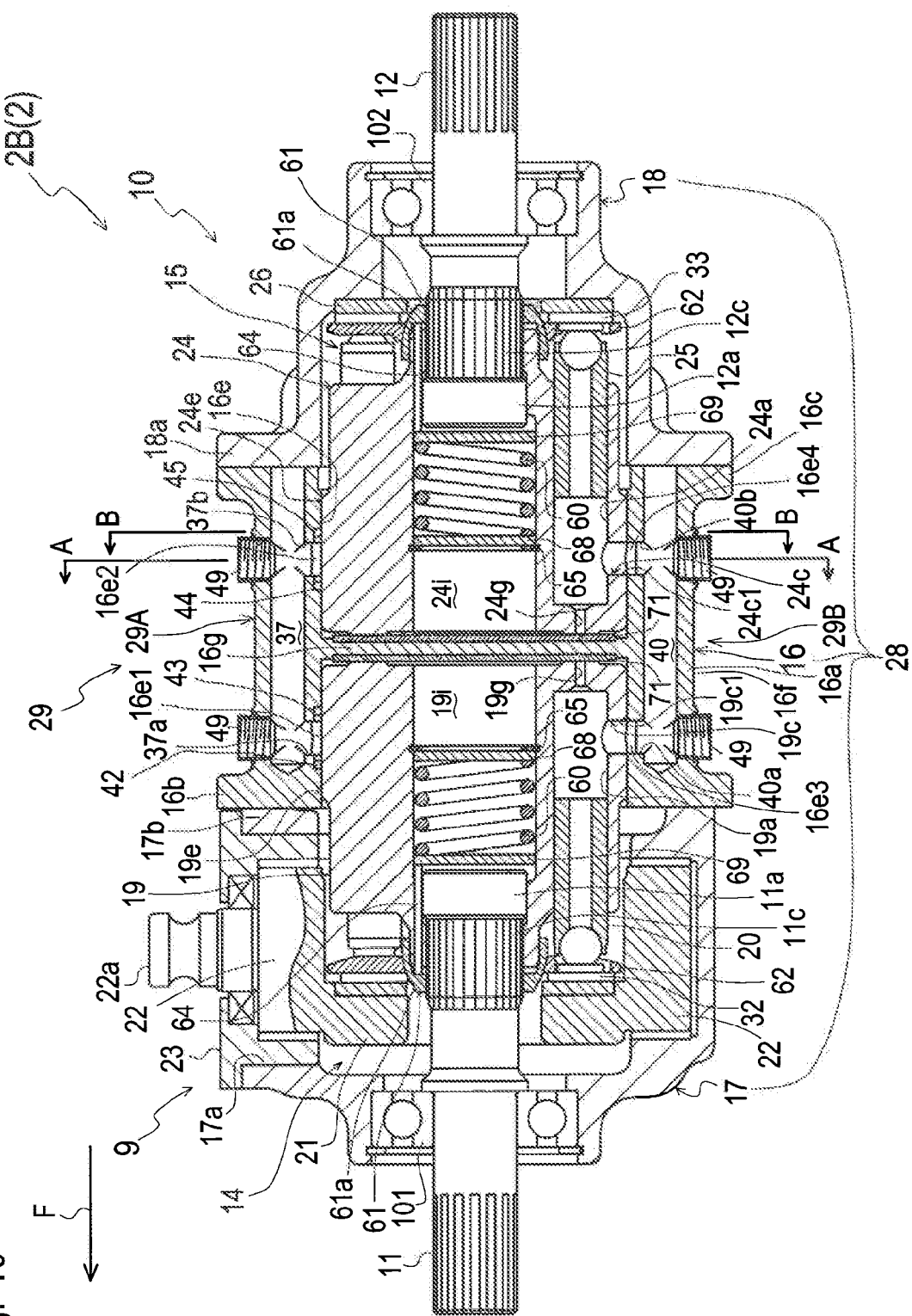
FIG. 10 is a sectional plan view of an HST 2B serving as a second embodiment of HST 2.
Figure 19:
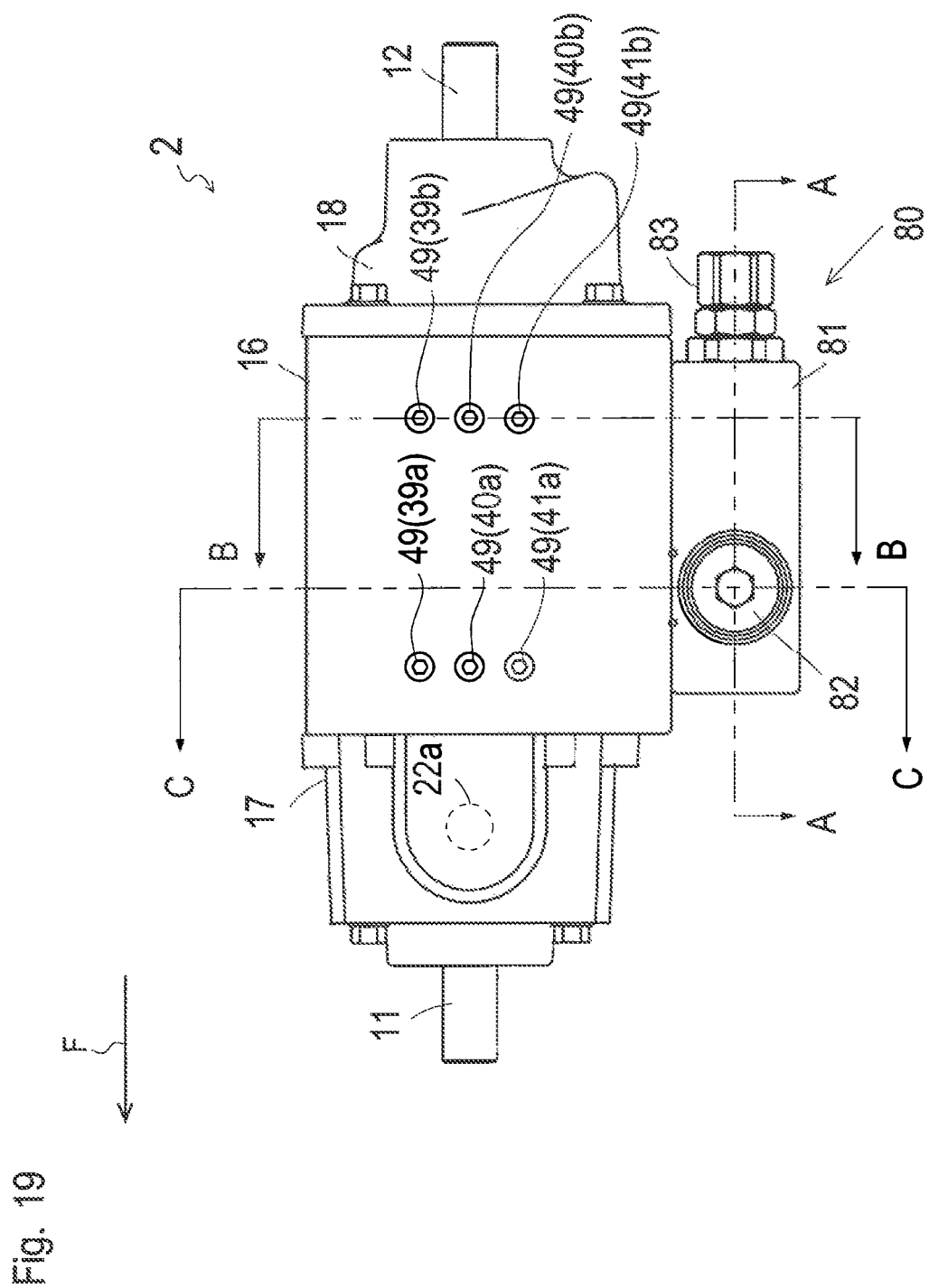
FIG. 19 is a side view of entire HST 2 having valve unit 80.
Figure 20:
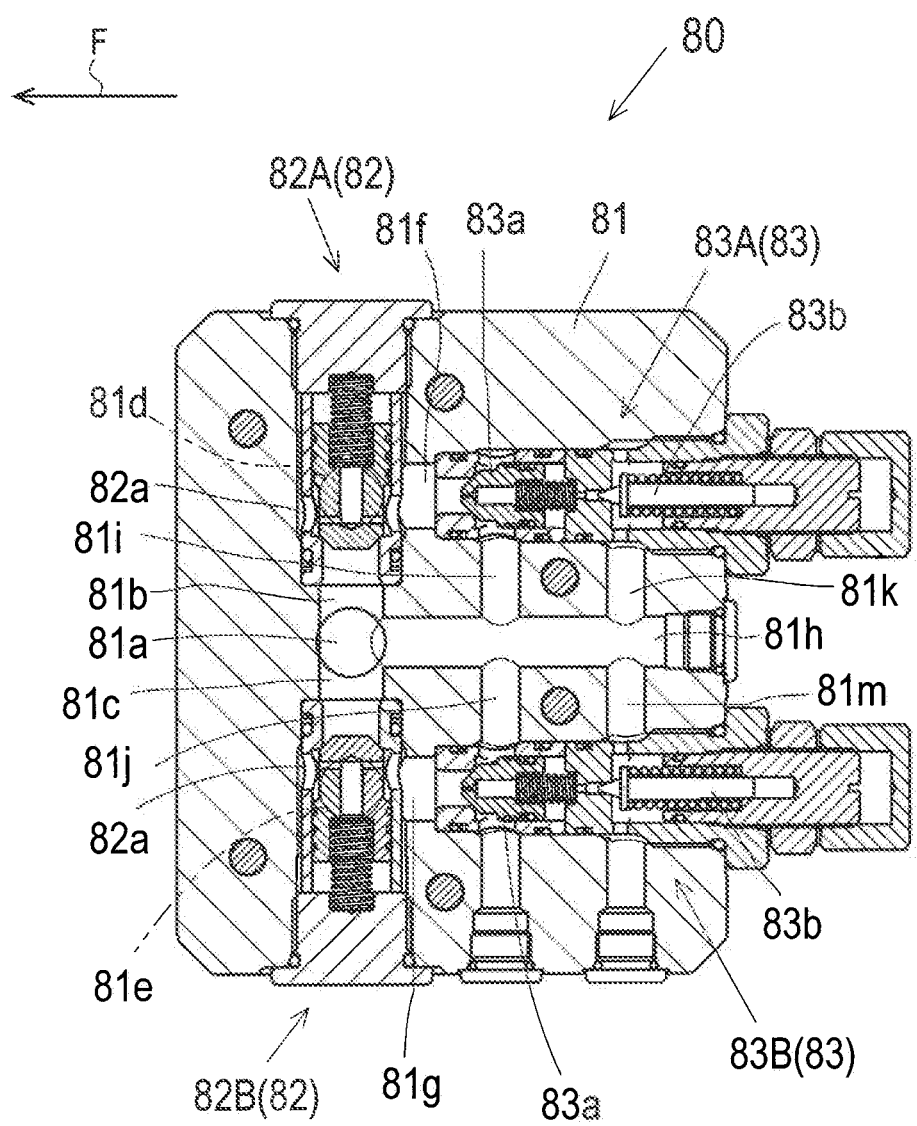
FIG. 20 is a cross sectional view taken along A-A line of FIG. 19.

As shown in FIGS. 2 and 10, HST 2 includes a hydraulic pump unit 9, a hydraulic motor unit 10 and a center casing 16. Hydraulic pump unit 9 includes an axial plunger type hydraulic pump 14 and a pump casing 17 incorporating hydraulic pump 14. Hydraulic motor unit 10 includes an axial piston type hydraulic motor 15 and a motor casing 18 incorporating hydraulic motor 15. Center casing 16 is interposed between pump casing 17 and motor casing 18 so as to fluidly connect hydraulic pump 14 to hydraulic motor 15. FIG. 19 illustrates an appearance of entire HST 2.

In hydraulic pump unit 9, pump shaft 11, a first plunger block 19, plungers 20 and a movable swash plate 21 are assembled together as a variable displacement hydraulic pump 14. Pump shaft 11 is inserted into plunger block 19 and is rotatably integrally fitted to plunger block 19. Plungers 20 are reciprocally fitted into axial plunger chambers 19a formed in plunger block 19. Swash plate 21 engages with tips of all of plungers 20 projecting outward from plunger block 19.

Movable swash plate 21 has a pair of trunnions 22 whose axes are perpendicular to pump shaft 11. Pump casing 17 has a side opening 17a into which a lid 23 is fitted. One of trunnions 22 is pivotally supported by lid 23 and has a projection 22a which projects outward from lid 23 so as to be fixedly provided thereon with a speed-changing arm.

Therefore, when the speed-changing arm is operated to rotate trunnions 22, a tilt angle of movable swash plate 21 is changed to define a reciprocation degree of plungers 20, thereby controlling the amount and direction of fluid delivery of hydraulic pump 14.

Similar to hydraulic pump unit 9, in hydraulic motor unit 10, motor shaft 12, a second plunger block 24, plungers 25 and a fixed swash plate 26 are assembled together as a fixed displacement hydraulic motor 15. Motor shaft 12 is inserted into plunger block 24 and is rotatably integrally fitted to plunger block 24. Plungers 25 are reciprocally fitted into axial plunger chambers 24a formed in plunger block 24. Swash plate 26 engages with tips of all of plungers 25 projecting outward from plunger block 24.

Center casing 16 has a main body 16a and front and rear flanges 16b and 16c. Main body 16a has a cylindrical hole that is coaxial to pump and motor shafts 11 and 12. Center casing 16 is radially expanded at front and rear ends of main body 16a so as to form front flange 16b and rear flange 16c. Front flange 16b contacts a rear open end 17b of pump casing 17. Rear flange 16c contacts a front open end 18a of motor casing 18. Flanges 16b and 16c are fastened to rear open end 17b of pump casing 17 and front open end 18a of motor casing 18 by bolts 31.

Therefore, pump casing 17, center casing 16 and motor casing 18 are continuously disposed in the fore-and-aft direction and are integrated as a housing 28 of HST 2. Pump shaft 11 is journalled by a bearing 101 in a front portion of pump casing 17. Motor shaft 12 is journalled by a bearing 102 in motor casing 18.

A closed fluid circuit 29 including a pair of main fluid passages 29A and 29B is provided in center casing 16 so as to fluidly connect hydraulic pump 14 to hydraulic motor 15 as detailed later.

Due to the above-mentioned structure, when power from engine 3 is inputted to pump shaft 11 so as to rotate hydraulic pump 14, hydraulic fluid in plunger chambers 16a is delivered from first plunger block 19 and is supplied to hydraulic motor 15 via closed fluid circuit 29 so that hydraulic motor 15 rotates by sucking and delivering the fluid so as to output a driving power.

Referring to FIGS. 2 to 5 and FIGS. 10 to 14, detailed description will be given of plunger blocks 19 and 24, plungers 20 and 25, swash plates 21 and 26, pump shaft 11 and motor shaft 12 in HST 2 (common to HSTs 2A and 2B). In plunger block 19, axial plunger chambers 19a are bored at regular intervals in the peripheral direction. Shoes 32 are mounted on outer tips of respective plungers 20 reciprocally fitted in plunger chambers 19a. On the other hand, in plunger block 24, axial plunger chambers 24a are bored at regular intervals in the peripheral direction. Shoes 33 are mounted on outer tips of respective plungers 25 reciprocally fitted in plunger chambers 24a.

Shoes 32 on all plungers 20 abut against swash plate 21. Shoes 33 on all plungers 25 abut against swash plate 26. When swash plate 21 is disposed at its neutral position and plunger block 19 rotates together with pump shaft 11, plungers 20 receive counter forces from swash plate 21 so as to reciprocally slide in respective plunger chambers 19a, thereby sucking and delivering hydraulic fluid into and from plunger chambers 19a. Accordingly, hydraulic fluid is sucked and delivered into and from plunger chambers 24a and plungers 25 receives counter forces from swash plate 26 so as to reciprocally slide in plunger chambers 24a, thereby rotating plunger block 24 together with motor shaft 12.

Pump shaft 11 has a front portion projecting forward from plunger block 19 and has a rear portion disposed in an axial hole 19i of plunger block 19. The front portion of pump shaft 11 projecting from plunger block 19 is journalled by pump casing 17 via bearing 101, and projects forwardly outward from pump casing 17 via bearing 101. Similarly, motor shaft 12 has a rear portion projecting rearward from plunger block 24 and has a front portion disposed in an axial hole 24i of plunger block 24. The rear portion of motor shaft 12 projecting from plunger block 24 is journalled by motor casing 18 via bearing 102, and projects rearwardly outward from motor casing 18 via bearing 102.

Plunger ports 19c1 are open at an outer peripheral surface 19e of plunger block 19. All plunger ports 19c1 are aligned in the peripheral direction of plunger block 19 and are connected to respective plunger chambers 19a via respective radial in-blocked fluid ducts 19c in plunger block 19. Similarly, plunger ports 24e1 are open at an outer peripheral surface 24e of plunger block 24. All plunger ports 24c1 are aligned in the peripheral direction of plunger block 24 and are connected to respective plunger chambers 24a via respective radial in-blocked fluid ducts 24c in plunger block 24. Therefore, fluid is sucked and delivered into and from plunger chambers 19a and 24a via outer peripheral surfaces 19e and 24e of plunger blocks 19 and 24.

Referring to FIGS. 5 and 14, herringbone grooves 35 are peripherally formed on outer peripheral surface 19e of plunger block 19 of hydraulic pump 14 adjacent to plunger ports 19c1 so as to serve as dynamic pressure grooves 35. Therefore, as plunger block 19 rotates, hydraulic fluid in herringbone grooves 35 functions as a dynamic pressure. The dynamic pressure functions as a bearing supporting plunger block 19 rotatably relative to center casing 16. In other words, due to the dynamic pressure, center casing 16 fluidly supports plunger block 19. In this way, herringbone grooves 35 causes a gap functioning as a bearing of dynamic pressure between outer peripheral surface 19e of plunger block 19 and inner peripheral surface 16e of center casing 16. This gap is referred to as a "bearing gap". Due to the dynamic pressure function of hydraulic fluid in this bearing gap, center casing 16 fluidly supports plunger block 19. Similarly, unshown herringbone grooves 35 serving as the dynamic pressure grooves are formed on outer peripheral surface 24e of plunger block 24 of hydraulic motor 15.

Alternatively, dynamic pressure grooves formed on outer peripheral surface 19e or 24e of each of plunger blocks 19 and 24 may be formed in multiplied arcuate shapes, for example. The only required thing for dynamic pressure grooves is to make fluid therein act as a dynamic pressure. The shape and size of dynamic pressure grooves are not limited. In this embodiment, the dynamic pressure grooves are provided on outer peripheral surfaces 19e and 24e of plunger blocks 19 and 24. Alternatively or additionally, the dynamic pressure grooves may be provided on inner peripheral surface 16e of center casing 16.

By providing the dynamic pressure grooves such as herringbone grooves 35 on at least one of outer peripheral surfaces 19e and 24e of plunger blocks 19 and 24 and inner peripheral surface 16e of center casing 16, hydraulic fluid in the dynamic pressure grooves on each of plunger blocks 19 and 24, even if plunger blocks 19 and 24 being rotated very fast, acts as the dynamic pressure to fluidly support each of plunger blocks 19 and 24 by inner peripheral surface 16e of center casing 16 so as to reduce abrasion and seizure of members or parts, thereby prolonging the life of the members or parts, improving the power transmission efficiency of HST 2, and reducing noises.

In comparison between FIGS. 2 and 10 and between FIGS. 5 and 14, description will now be given of the structure difference of plunger blocks 19 and 24 between HST 2A and HST 2B and of the structure difference of support of plunger blocks 19 and 24 in center casing 16 between HST 2A and HST 2B.

In comparison with plunger blocks 19 and 24 of HST 2B each having a substantially constant diameter in the whole axial range, plunger blocks 19 and 24 of HST 2A are formed at respective axial proximal end portions thereof with respective small diameter portions 19b and 24b. More specifically, small diameter portion 19b is formed on a rear end portion of plunger block 19, and small diameter portion 24b is formed on a front end portion of plunger block 24.

Accordingly, in HST 2A, outer peripheral surface 19e of plunger block 19 having plunger ports 19c1 open is axially shortened forward so as to ensure small diameter portion 19b so that only one peripheral line of herringbone grooves 35 is formed forward of plunger ports 19c1 as shown in FIG. 5. This line of herringbone grooves 35 is disposed at a substantially central portion of outer peripheral surface 19e between front and rear ends of outer peripheral surface 19e. Similarly, in HST 2A, only one peripheral line of herringbone grooves 35 (not shown) is formed on outer peripheral surface 24e rearward of plunger ports 24c1.

On the contrary, in HST 2B, outer peripheral surface 19e of plunger block 19 having plunger ports 19c1 open is axially extended rearward from plunger ports 19c1 in place of small diameter portion 19b so that two front and rear peripheral lines of herringbone grooves 35 are formed forward and rearward of plunger ports 19c1 as shown in FIG. 14. Similarly, in HST 2B, two peripheral lines of herringbone grooves 35 (not shown) are formed on outer peripheral surface 24e forward and rearward of plunger ports 24c1.

The above-mentioned shape difference of plunger blocks 19 and 24 between HST 2A and HST 2B and the above-mentioned arrangement difference of herringbone grooves 35 between HST 2A and HST 2B correspond to the difference between HST 2A and HST 2B with regard to the structure of supporting plunger blocks 19 and 24 in center casing 16. As shown in FIG. 2, in HST 2A, each of taper roller bearings 30 is interposed between inner peripheral surface 16e of center casing 16 and each of outer peripheral surfaces of small diameter portions 19b and 24b of plunger blocks 19 and 24 so as to endure both the radial force and the thrust force from center casing 16 and each of plunger blocks 19 and 24. In other words, in HST 2A, plunger blocks 19 and 24 are supported by center casing 16 by the mechanical support of small diameter portions 19b and 24b via taper roller bearings 30 in cooperation with the fluidal support caused by the dynamic pressure action of fluid in the peripheral lines of herringbone grooves 35 on outer peripheral surfaces 19e and 24e of plunger blocks 19 and 24.

On the contrary, HST 2B has no mechanical bearing like taper roller bearing 30 for mechanically supporting each of plunger blocks 19 and 24 in center casing 16. HST 2B supports plunger blocks 19 and 24 in center casing 16 by means of the fluidal support caused by the dynamic pressure action of fluid in the two front and rear peripheral lines of herringbone grooves 35 on each of outer peripheral surfaces 19e and 24e.

A fluid passage structure in center casing 16 in HST 2 (common to HST 2A and HST 2B) will be described with reference to FIGS. 2 to 4, 6, 7, 10 to 13, 15, 17, 19, 21 and 22. As mentioned above, first main fluid passage 29A and second main fluid passage 29B constitute closed fluid circuit 29 fluidly connecting hydraulic pump 14 to hydraulic motor 15. First main fluid passage 29A includes the group of first encased fluid ducts 36, 37 and 38 and first and second peripheral grooves 16e1 and 16e2. Second main fluid passage 29B includes the group of second encased fluid ducts 39, 40 and 41 and third and fourth peripheral grooves 16e3 and 16e4. First and second main fluid passages 29A and 29B are distributed between opposite portions of center casing 16 with respect to an axis of center casing 16 coinciding to the axes of pump and motor shafts 11 and 12. Based on the direction of arrow F as shown in FIGS. 2 and 10, in this embodiment, first main fluid passage 29A is formed in a right side portion of center casing 16, and second main fluid passages 29B is formed in a left side portion of center casing 16.

When hydraulic pump 14 is driven by power from engine 3 as mentioned above, one of main fluid passages 29A and 29B functions as a higher-pressurized fluid passage making fluid flow from hydraulic pump 14 to hydraulic motor 15, and the other of main fluid passages 29A and 29B functions as a lower-pressurized fluid passage making fluid from hydraulic motor 15 to hydraulic pump 14. Which main fluid passage is pressurized higher or lower depends on whether movable swash plate 21 is set in a direction to rotate hydraulic motor 15 (motor shaft 12) in the normal direction or in the reverse direction, i.e., whether vehicle 1 travels forward or backward. In this embodiment, it is assumed that first main fluid passage 29A in the right side portion of center casing 16 is higher-pressurized and second main fluid passage 29B in the left side portion of center casing 16 is lower-pressurized. Hereinafter, description will be given on this assumption.

In the right side wall portion of center casing 16 between inner peripheral surface 16e and an outer peripheral surface 16f of center casing 16, three first encased fluid ducts 36, 37 and 38 are bored so as to extend in the fore-and-aft direction along the axial direction of pump and motor shafts 11 and 12. First encased fluid ducts 36, 37 and 38 are aligned vertically at substantially regular intervals along a circle centered on the axes of pump and motor shafts 11 and 12. First encased fluid ducts 36, 37 and 38 extend respective lateral ports 36a, 37a and 38a from respective front ends thereof, and extend respective lateral ports 36b, 37b and 38b from respective rear ends thereof.

Figure 3:
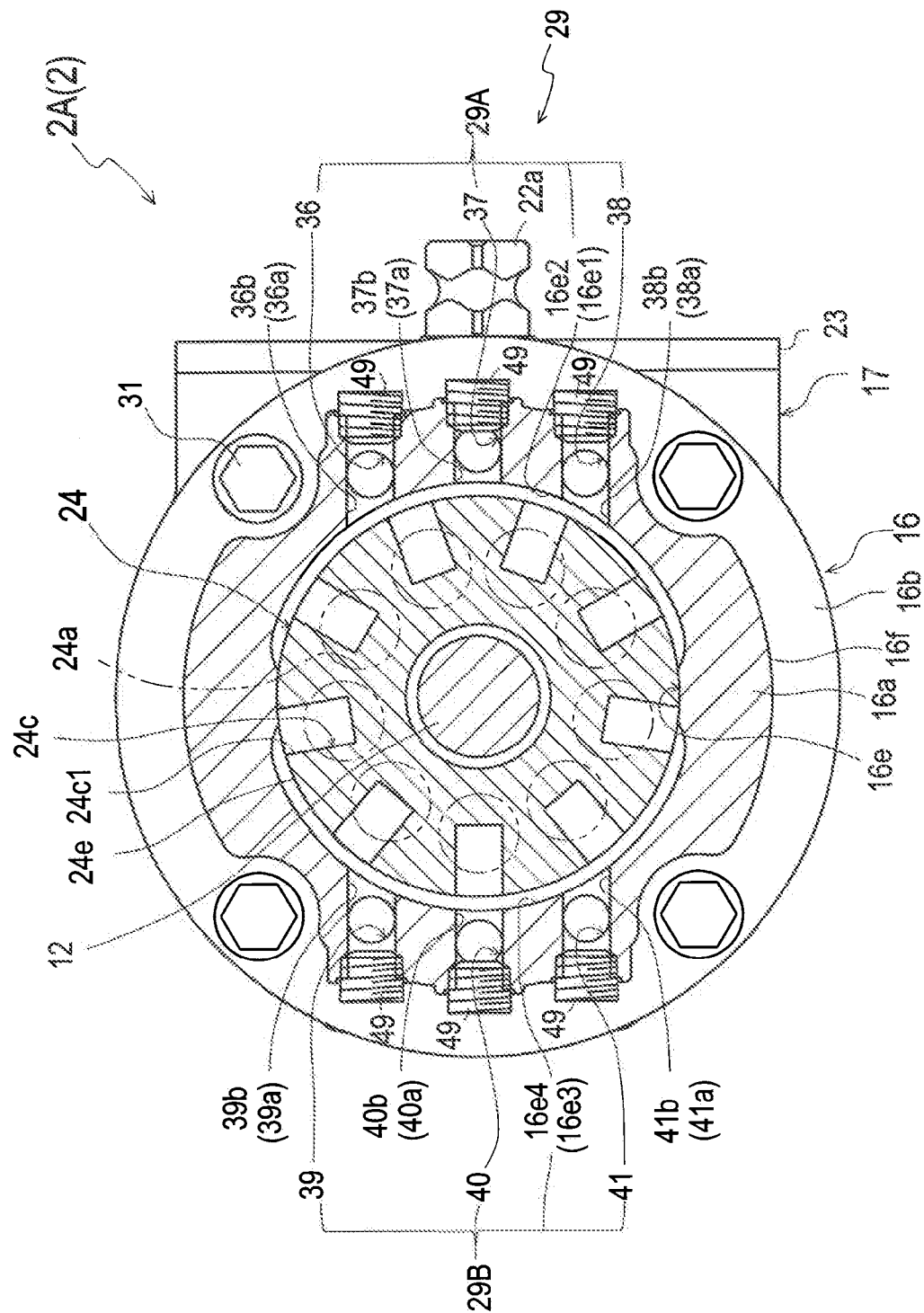
FIG. 3 is a cross sectional view taken along A-A line of FIG. 2.
Figure 12:
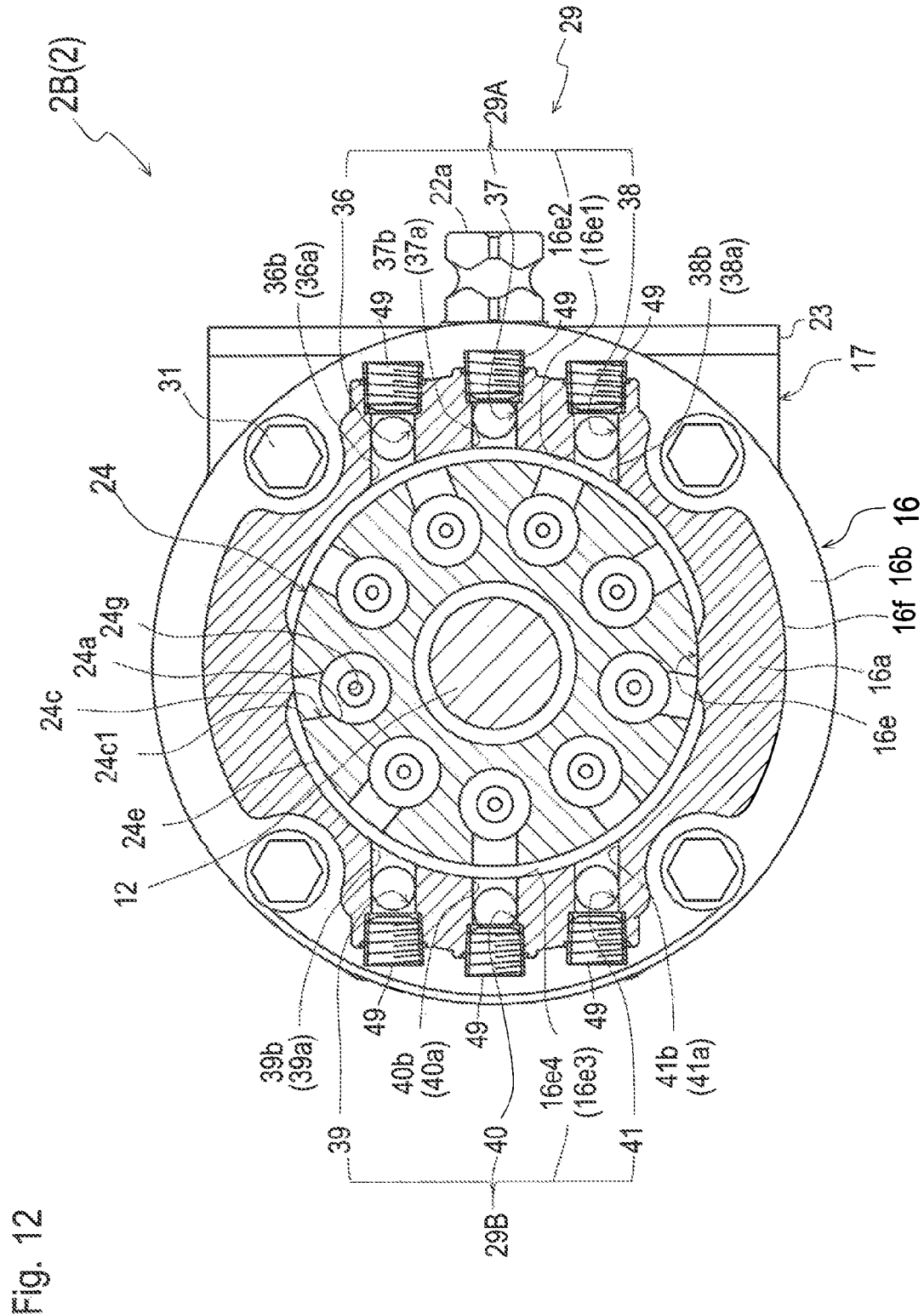
FIG. 12 is a cross sectional view taken along A-A line of FIG. 10.

Front and rear peripheral grooves 16e1 and 16e2 are formed on inner peripheral surface 16e of the right side portion of center casing 16 so as to constitute first main fluid passage 29A. As shown in FIGS. 3 and 12, ports 36b, 37b and 38b from the rear ends of first encased fluid ducts 36, 37 and 38 are joined at laterally proximal ends (left ends) thereof to rear peripheral groove 16e2. Similarly to ports 36b, 37b and 38b, as understood from FIGS. 3 and 12, ports 36a, 37a and 38a from the front ends of first encased fluid ducts 36, 37 and 38 are joined at laterally proximal ends (left ends) thereof to front peripheral groove 16e1. Ports 36a, 36b, 37a, 37b, 38a and 38b have laterally distal ends (right ends) open at outer peripheral surface (right side surface) 16f of center casing 16 and these open ends are closed by respective plugs 49.

On the other hand, in the left side wall portion of center casing 16 between inner peripheral surface 16e and outer peripheral surface 16f of center casing 16, three second encased fluid ducts 39, 40 and 41 are bored so as to extend in the fore-and-aft direction along the axial direction of pump and motor shafts 11 and 12. Second encased fluid ducts 39, 40 and 41 are aligned vertically at substantially regular intervals along a circle centered on the axes of pump and motor shafts 11 and 12. Second encased fluid ducts 39, 40 and 41 extend respective lateral ports 39a, 40a and 41a from respective front ends thereof, and extend respective lateral ports 39b, 40b and 41b from respective rear ends thereof.

Front and rear peripheral grooves 16e3 and 16e4 are formed on inner peripheral surface 16e of the left side portion of center casing 16 so as to constitute second main fluid passage 29B. As shown in FIGS. 3 and 12, ports 39b, 40b and 41b from the rear ends of second encased fluid ducts 39, 40 and 41 are joined at laterally proximal ends (right ends) thereof to rear peripheral groove 16e4. Similarly to ports 39b, 40b and 41b, as understood from FIGS. 3 and 12, ports 39a, 40a and 41a from the front ends of second encased fluid ducts 39, 40 and 41 are joined at laterally proximal ends (right ends) thereof to front peripheral groove 16e3. Ports 39a, 39b, 40a, 40b, 41a and 41b have laterally distal ends (left ends) open at outer peripheral surface (left side surface) 16f of center casing 16 and these open ends are closed by respective plugs 49.

As shown in FIGS. 3, 6, 12 and 15, rear peripheral grooves 19e2 and 19e4 are disposed at the same position in the axial (fore-and-aft) direction so that, as shown in FIGS. 3 and 12, peripheral groove 19e2 is formed along a right half of a circle centered on the axis of motor shaft 12, and peripheral groove 19e4 is formed along a left half of this circle. These peripheral grooves 19e2 and 19e4 face the group of plunger ports 24c1 peripherally aligned on outer peripheral surface 24e of plunger block 24 of hydraulic motor 15 so as to be open to plunger ports 24c1.

Figure 6:
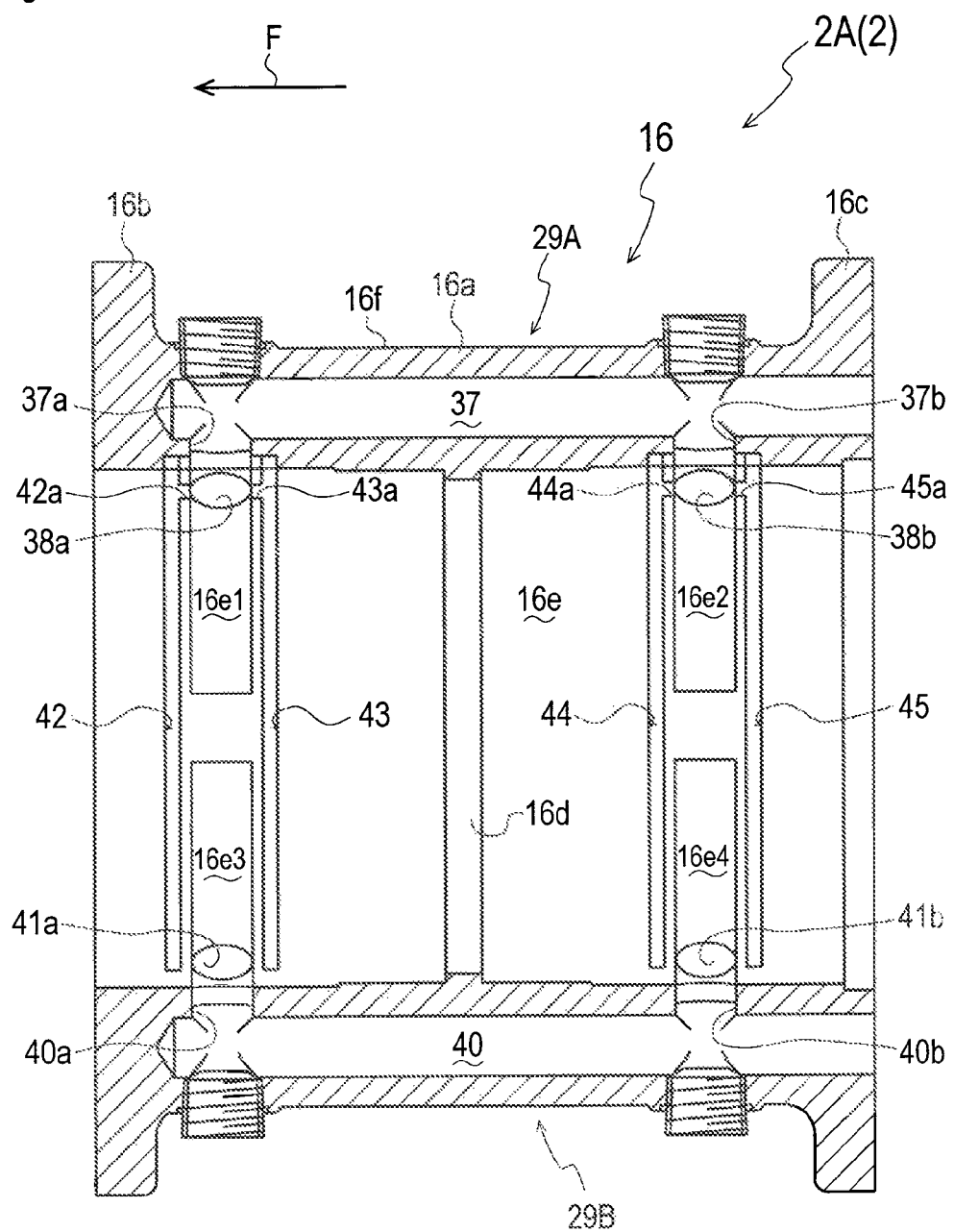
FIG. 6 is a sectional plan view of a center casing 16 of HST 2A.
Figure 15:
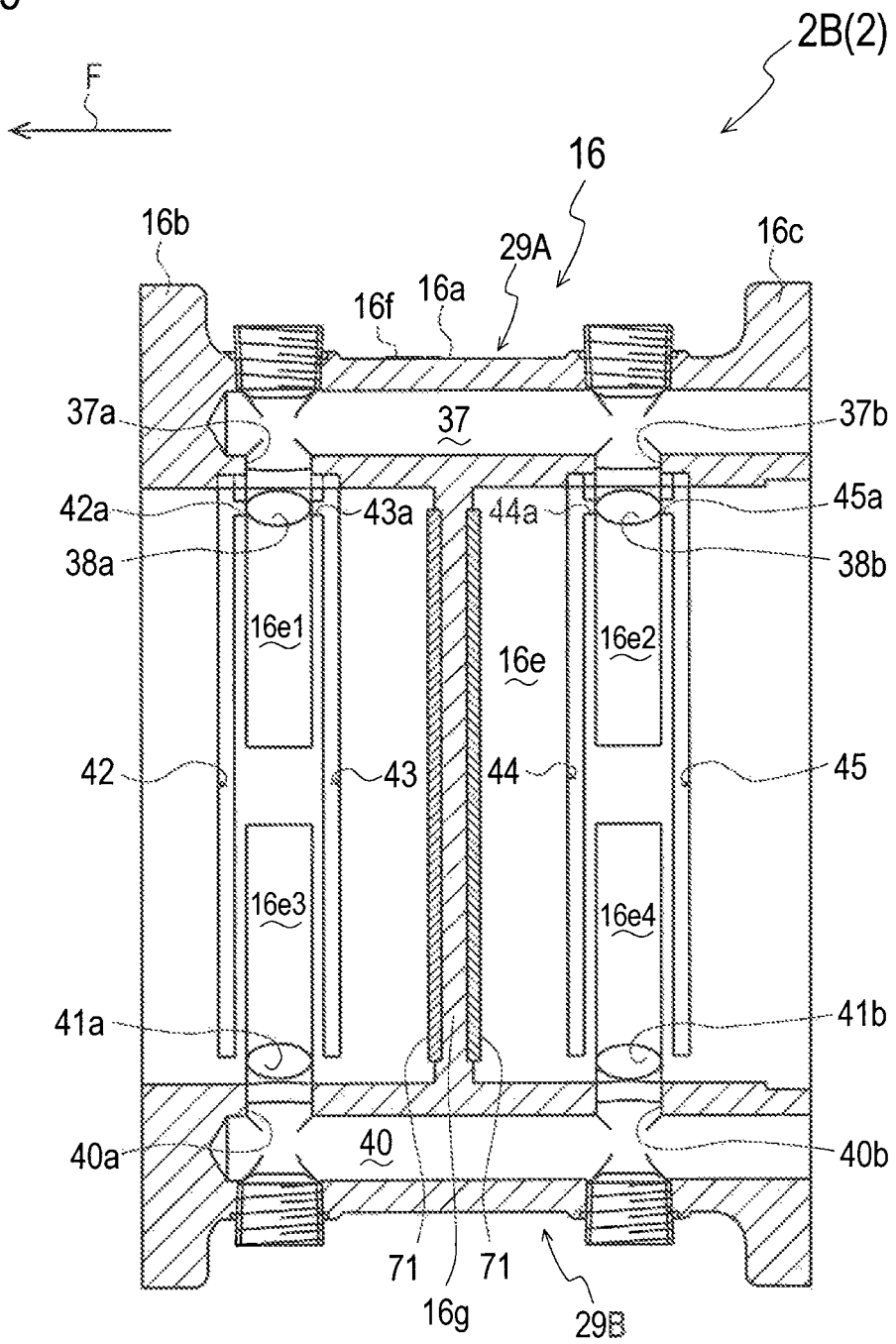
FIG. 15 is a sectional plan view of center casing 16 of HST 2B.
Figure 16:
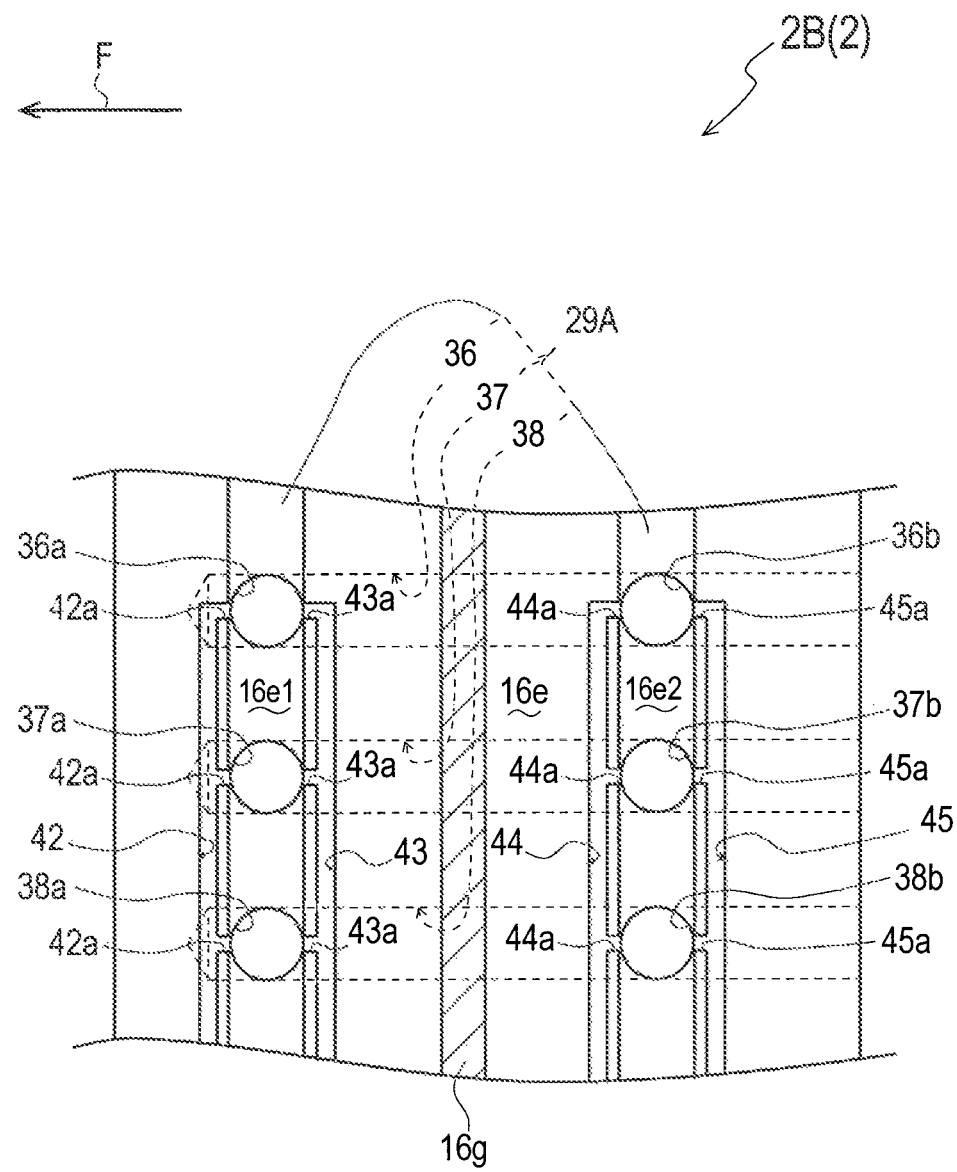
FIG. 16 is a fragmentary sectional side view of center casing 16 of HST 2B showing pressure balancing grooves 42, 43, 44 and 45 branching from peripheral grooves 16e1 and 16e2 on an inner peripheral surface 16e of center casing 16.

On the other hand, as shown in FIGS. 6 and 15, front peripheral grooves 19e1 and 19e3 are disposed at the same position in the axial (fore-and-aft) direction so that, as understood from the arrangement of rear peripheral grooves 16e2 and 16e4 shown in FIGS. 3 and 12, peripheral groove 19e1 is formed along a right half of a circle centered on the axis of pump shaft 11, and peripheral groove 19e3 is formed along a left half of this circle. These peripheral grooves 19e1 and 19e3 face the group of plunger ports 19c1 peripherally aligned on outer peripheral surface 19e of plunger block 19 of hydraulic pump 14 so as to be open to plunger ports 19c1.

During the forward traveling of vehicle 1, in higher-pressurized first main fluid passage 29A, front peripheral groove 16e1 receives fluid delivered from plunger chambers 19a in rotating plunger block 19 of hydraulic pump 14 via plunger ports 19c1, and the fluid flows from front peripheral groove 16e1 to rear peripheral groove 16e2 via front lateral ports 36a, 37a and 38a, first encased fluid ducts 36, 37 and 38 and rear lateral ports 36b, 37b and 38b. The fluid is supplied from rear peripheral groove 16e2 to plunger chambers 24a via plunger ports 24c1, thereby rotating plunger block 24 of hydraulic motor 15 in the normal direction. In lower-pressurized second main fluid passage 29B, rear peripheral groove 16e4 receives the fluid delivered from plunger chambers 24a in plunger block 24 via plunger ports 24c1, and the fluid flows from rear peripheral groove 16e4 to front peripheral groove 16e3 via rear lateral ports 39b, 40b and 41b, second encased fluid ducts 39, 40 and 41 and front lateral ports 39a, 40a and 41a. The fluid is supplied from front peripheral groove 16e3 to plunger chambers 19a in plunger block 19 via plunger ports 19c1.

Figure 4:
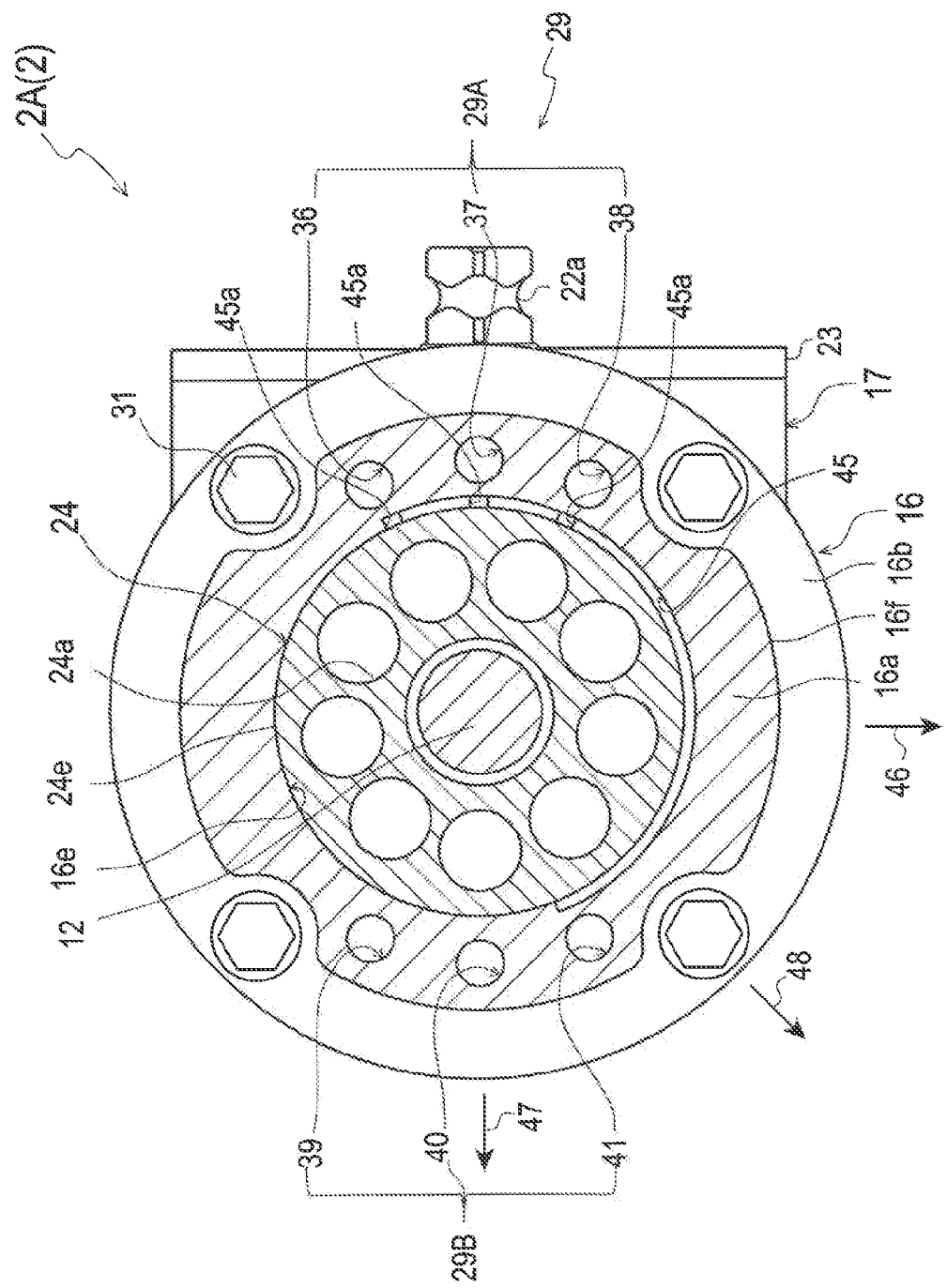
FIG. 4 is a cross sectional view taken along B-B line of FIG. 2.
Figure 13:
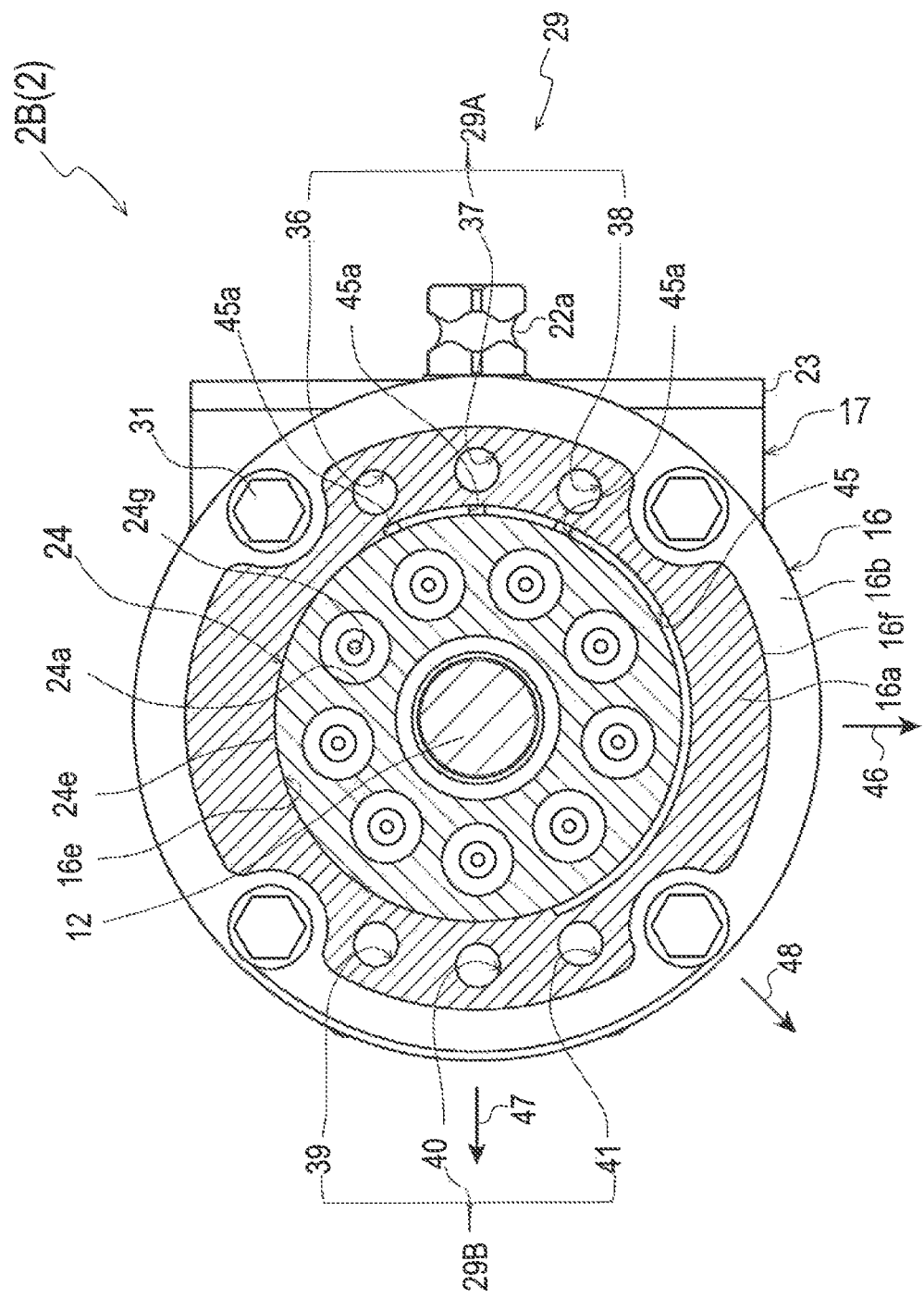
FIG. 13 is a cross sectional view taken along B-B line of FIG. 10.

Referring to hydraulic motor 15 as shown in FIGS. 4 and 13, plungers 25 reciprocating in respective plunger chambers 24a receive a counter force 46 (downward in FIGS. 4 and 13) from fixed swash plate 26 abutting against heads of plungers 25, and meanwhile, plunger block 24 receives a hydraulic pressure force 47 (leftward in FIGS. 4 and 13) caused by the differential hydraulic pressure between higher-pressurized first main fluid passage 29A and lower-pressurized second main fluid passage 29B. Consequently, a pressure force 48 (leftwardly downward in FIGS. 4 and 13) as a resultant force of counter force 46 and hydraulic pressure force 47 is applied to plunger block 24. Similarly, pressure force 48 is applied to plunger block 19 of hydraulic pump 14. As pressure force 48 increases, a possibility increases that corresponding plunger block 19 or 24 is pressed against inner peripheral surface 16e of center casing 16 so as to contact inner peripheral surface 16e though the bearing gap is provided between inner peripheral surface 16e of center casing 16 and inner peripheral surface 19e or 24e of corresponding plunger block 19 or 24.

To avoid such a pressure of plunger blocks 19 and 24 against center casing 16, as shown in FIGS. 6, 7, 15 and 16, pressure balancing grooves 42, 43, 44 and 45 are peripherally extended on inner peripheral surface 16e of center casing 16 along peripheral grooves 16e1, 16e2, 16e3 and 16e4 so as to lead high-pressurized fluid from first main fluid passage 29A higher-pressurized during forward traveling of vehicle 1 to the portion to which pressure forces 48 are applied, i.e., the right lower portion of inner peripheral surface 16e of center casing 16. FIGS. 4 and 13 illustrate pressure balancing groove 45 that extends in a substantially half peripheral range of inner peripheral surface 16e from a right upper portion of center casing 16 to the left lower portion of center casing 16. Other pressure balancing grooves 42, 43 and 44 also extend in the same way.

As shown in FIGS. 4, 6, 7, 13, 15 and 16, pressure balancing groove 45 is extended along peripheral grooves 16e2 and 16e4 adjacent to rear ends of peripheral grooves 16e2 and 16e4, and three connection grooves 45a are extended axially forward from pressure balancing groove 45 and are joined to respective junctions of peripheral groove 16e2 to ports 36b, 37b and 38b. As shown in FIGS. 6, 7, 15 and 16, pressure balancing groove 44 is extended along peripheral grooves 16e2 and 16e4 adjacent to front ends of peripheral grooves 16e2 and 16e4 opposite pressure balancing groove 45, and three connection grooves 44a are extended axially rearward from pressure balancing groove 44 opposite respective connection grooves 45a and are joined to respective junctions of peripheral groove 16e2 to ports 36b, 37b and 38b. Further, as shown in FIGS. 6, 7, 15 and 16, opposite pressure balancing grooves 42 and 43 are extended along peripheral grooves 16e1 and 16e3 adjacent to front and rear ends of peripheral grooves 16e1 and 16e3, and three pairs of opposite connection grooves 42a and 43a are extended axially forward and rearward from respective pressure balancing grooves 42 and 43 and are joined to respective junctions of peripheral groove 16e1 to ports 36a, 37a and 38a. In this way, pressure balancing grooves 42 and 43 are connected to front peripheral groove 16e1 and pressure balancing grooves 44 and 45 are connected to rear peripheral groove 16e2 so that pressure balancing grooves 42, 43, 44 and 45 receive high-pressurized fluid from first main fluid passage 29A.

Pressure balancing groove 45 extended along right peripheral groove 16e2 and along left peripheral groove 16e4 extends in the substantially half peripheral range of inner peripheral surface 16e from the right upper portion of center casing 16 to the left lower portion of center casing 16, as shown in FIGS. 4 and 13. Similarly, other pressure balancing grooves 42, 43 and 44 extend in the substantially half peripheral range of inner peripheral surface 16e of from the right upper portion of center casing 16 to the left lower portion of center casing 16. Therefore, high-pressurized fluid in first main fluid passage 29A higher-pressurized during forward traveling of vehicle 1 is supplied via pressure balancing grooves 42, 43, 44 and 45 to the left lower portion of inner peripheral surface 19e of center casing 16 to which pressure forces 48 are applied, whereby the high-pressurized fluid resists pressure forces 48 so as to reduce the pressure of rotating plunger blocks 19 and 24 against the left lower portion of inner peripheral surface 16e of center casing 16. Consequently, the bearing gap is ensured between center casing 16 and each of plunger blocks 19 and 24 so as to reduce abrasion and seizure of members and parts in HST 2, thereby prolonging life of the members and parts, improving the power transmission efficiency of HST 2 and reducing noises. Alternatively, peripheral groove 16e1 or 16e2 may be provided with only one pressure balancing groove adjoining either the front or rear end thereof.

Further, in HST 2 (common to HSTs 2A and 2B), front and rear end edges of each of plunger blocks 19 and 24 are rounded so as to reduce the above-mentioned problems caused by the pressure of plunger blocks 19 and 24 against inner peripheral surface 16e of center casing 16.

Figure 7:
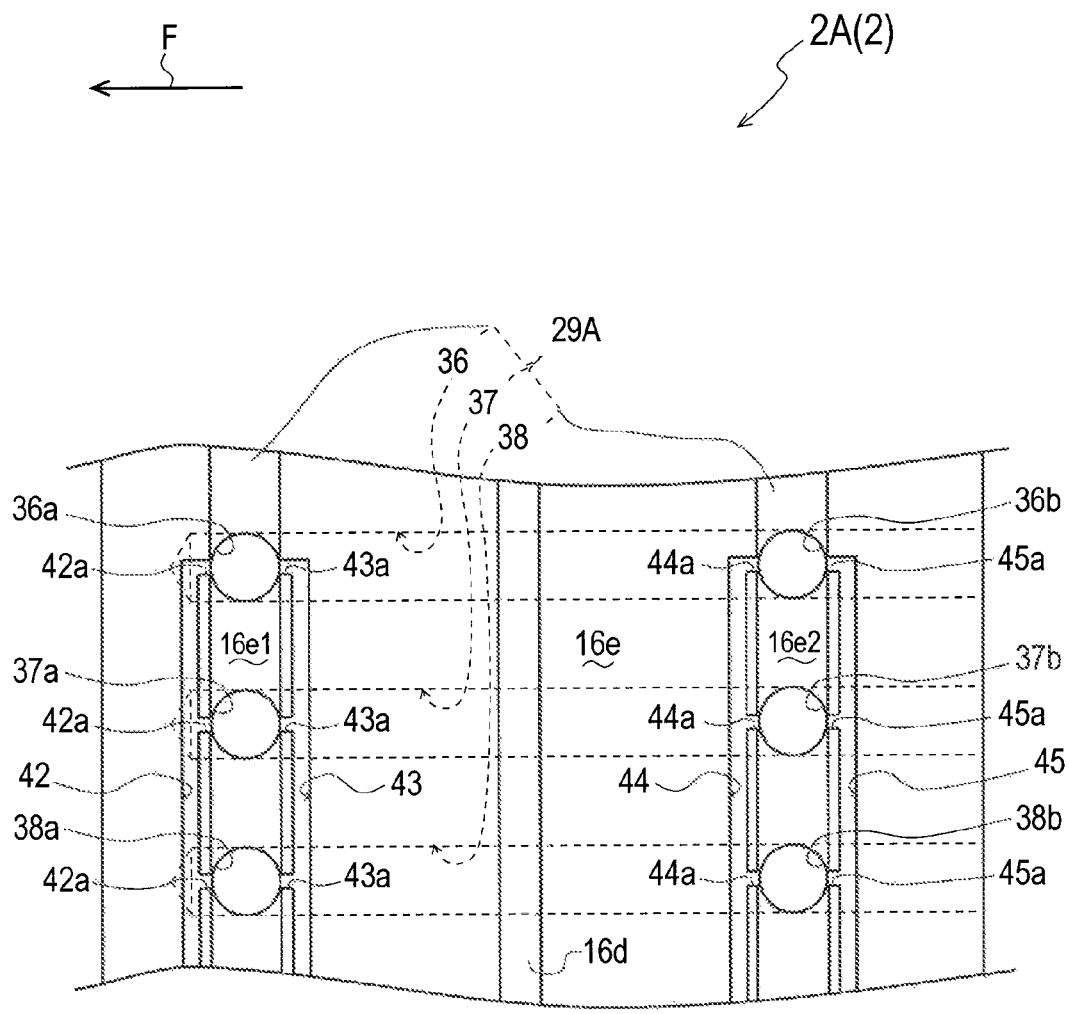
FIG. 7 is a fragmentary sectional side view of center casing 16 of HST 2A showing pressure balancing grooves 42, 43, 44 and 45 branching from peripheral grooves 16e1 and 16e2 on an inner peripheral surface 16e of center casing 16.

A partition structure of center casing 16 of HST 2B between plunger blocks 19 and 24 differs from a structure of center casing 16 of HST 2A between plunger blocks 19 and 24. In HST 2A, as shown in FIGS. 2, 6 and 7, a ring-shaped retaining portion 16d project radially inward from a fore-and-aft center portion of inner peripheral surface 16e of main body 16a of center casing 16. As shown in FIG. 2, front and rear taper roller bearings 30 are positioned so as to clamp retaining portion 16d therebetween. Small diameter portion 19b of plunger block 19 is inserted into front taper roller bearing 30, and small diameter portion 24b of plunger block 24 is inserted into rear taper roller bearing 30.

Figure 11:
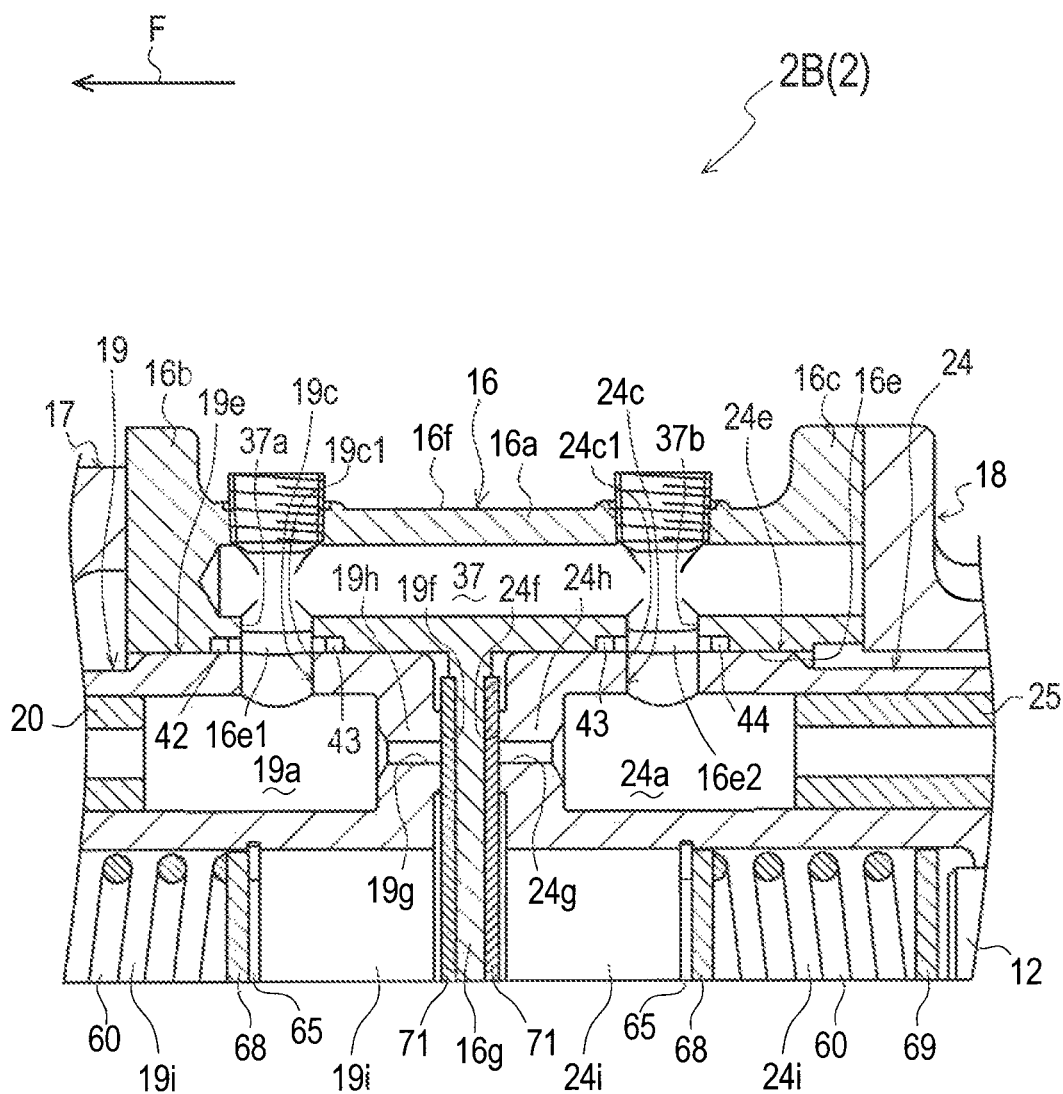
FIG. 11 is an enlarged fragmentary sectional plan view of HST 2B showing a partition between plunger blocks 19 and 24.

On the contrary, in HST 2B, a vertical partition wall 16g is formed on a fore-and-aft center portion of inner peripheral surface 16e of main body 16a of center casing 16 so as to partition the inner space surrounded by inner peripheral surface 16e of center casing 16 into front and rear chambers. Abrasion resistant discoid support plates 71 are spread on front and rear vertical surfaces of partition wall 16g. As shown in FIG. 11, plunger blocks 19 and 24 are formed with respective axial projections 19f and 24f at respective axially proximal end portions thereof, i.e., at the rear end portion of plunger block 19 and the front end portion of plunger block 24. Projections 19f and 24f abut against respective support plates 71.

Orifices 19g are bored in plunger block 19 between vertical end surfaces of plunger chambers 19a and a vertical rear end surface of projection 19f and are open at the vertical rear end surface of projection 19f so as to supply (or apply) fluid from plunger chambers 19a onto front support plate 71 so that the hydraulic pressure of fluid in plunger chambers 19a and the pressure of fluid applied onto front support plate 71 via orifices 19g counterbalance each other in a wall 19h of plunger block 19 between the vertical end surface of plunger chambers 19a and the rear end surface of projection 19f. Orifices 24g are bored in plunger block 24 between the vertical end surfaces of plunger chambers 24a a vertical front end surface of projection 24f and are open at the vertical front end surface of projection 24f so as to supply (or apply) fluid from plunger chambers 24a onto rear support plate 71 so that the hydraulic pressure of fluid in plunger chambers 24a and the pressure of fluid applied onto rear support plate 71 via orifices 24g counterbalance each other in a wall 24h of plunger block 24 between the vertical end surface of plunger chambers 24a and the front end surface of projection 24f. Therefore, the thrust stresses against partition wall 16g are reduced so as to reduce the frictional resistance of partition wall 16g caused by the thrust stresses, thereby reducing abrasion and seizure of members and parts in HST 2B, prolonging life of the members and parts, improving the power transmission efficiency of HST 2B and reducing noises.

With regard to HST 2A, a structure for supporting pump and motor shafts 11 and 12 and a structure for causing an axial thrust force as a basing force toward swash plates 21 and 25 will be described. In HST 2A, as shown in FIG. 2, the rear portion of pump shaft 11 disposed in axial hole 19i of plunger block 19 is formed with a boss portion 11a, a spline portion 11c and an axial extension portion 11b between boss portion 11a and spline portion 11c. The above-mentioned front portion of pump shaft 11 projecting outward from plunger block 19 is extended forward from boss portion 11a. Axial extension portion 11b is diametrically smaller than axial hole 19i so as to have a gap between its outer peripheral surface and an inner peripheral surface of plunger block 19 defining axial hole 19i. Boss portion 11a is substantially diametrically as large as axial hole 19i. When pump shaft 11 is inserted into axial hole 19i, an outer peripheral surface of boss portion 11a slidably abuts against the inner peripheral surface of plunger block 19 so as to align the axis of pump shaft 11. After hydraulic pump unit 9 is completely assembled, boss portion 11a is disposed to contact a front end portion of the inner peripheral surface of plunger block 19. A rear end portion of the inner peripheral surface of plunger block 19 surrounded by small diameter portion 19b is splined. This splined rear end portion of the inner peripheral surface of plunger block 19 is spline-fitted to spline portion 11c of pump shaft 11 so that plunger block 19 engages with pump shaft 11 unrotatably relative to pump shaft 11, i.e., rotatably integrally with pump shaft 11.

Similarly, the front portion of motor shaft 12 in axial hole 24i of plunger block 24 is formed with a boss portion 12a, a spline portion 12c and an axial extension portion 12b between boss portion 12a and spline portion 12c. An outer peripheral surface of boss portion 12a contacts a rear end portion of an inner peripheral surface of plunger block 24 so as to align the axis of motor shaft 12. A front end portion of the inner peripheral surface of plunger block 24 surrounded by small diameter portion 24b is splined and is spline-fitted to spline portion 12c so that plunger block 24 engages with motor shaft 12 unrotatably relative to motor shaft 12, i.e., rotatably integrally with motor shaft 12.

Further, in HST 2A, as shown in FIG. 2, springs 34 are interposed in respective plunger chambers 19a between respective plungers 20 and the respective vertical end surfaces of plunger chambers 19a opposite swash plate 21. Also, springs 34 are interposed in respective plunger chambers 24a between respective plungers 25 and the respective vertical end surfaces of plunger chambers 24a opposite swash plate 26. The spring forces of springs 34 constantly bias plungers 20 toward swash plate 21 and constantly bias plungers 25 toward swash plate 26, thereby surely keeping pace of shoes 32 and 33 with respective swash plates 21 and 26 so as to ensure the speed change operation of HST 2A with precision.

Figure 8:
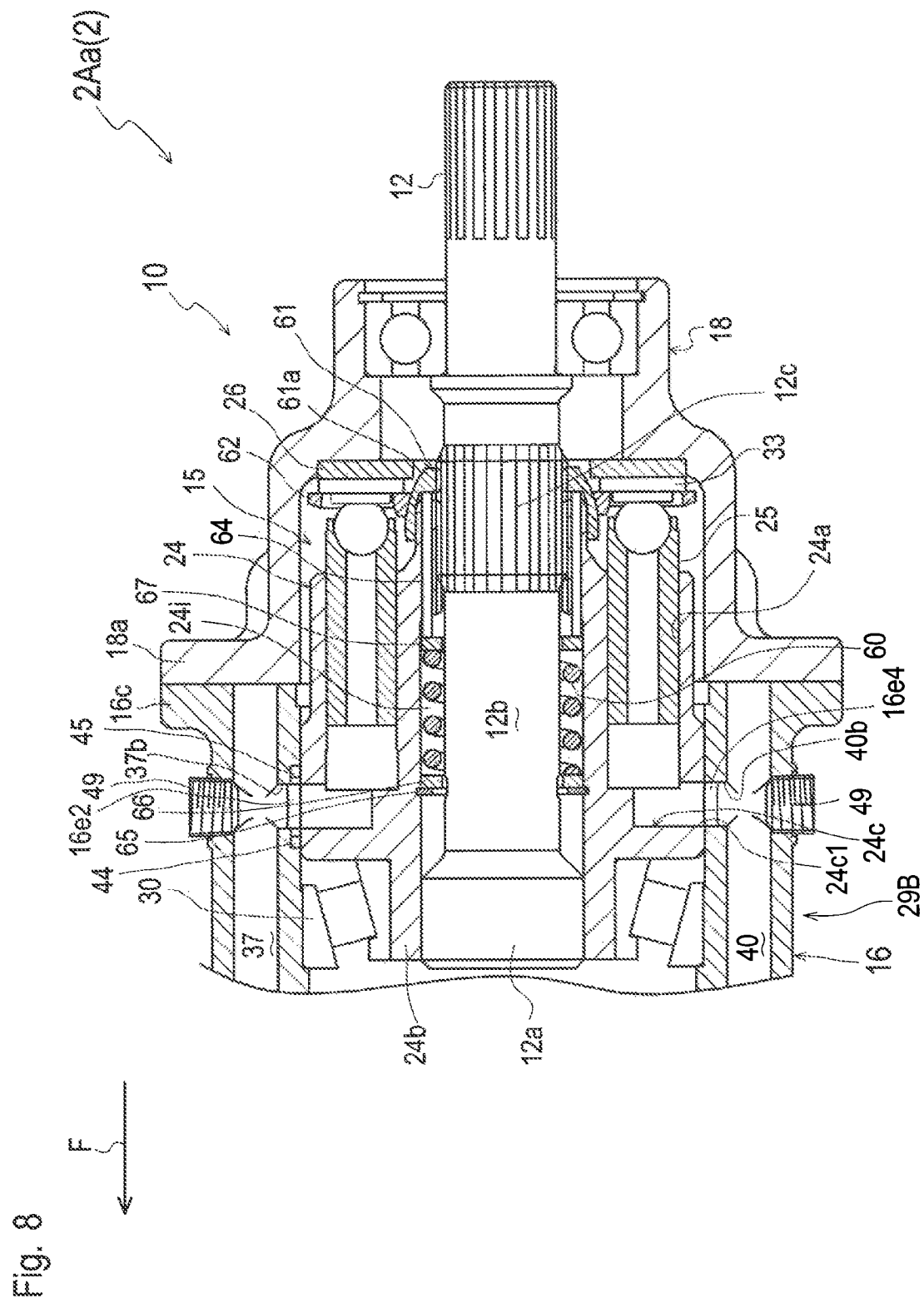
FIG. 8 is a fragmentary sectional plan view of an HST 2Aa serving as a first modification of HST 2A showing a motor unit 10 of HST 2Aa.
Figure 9:
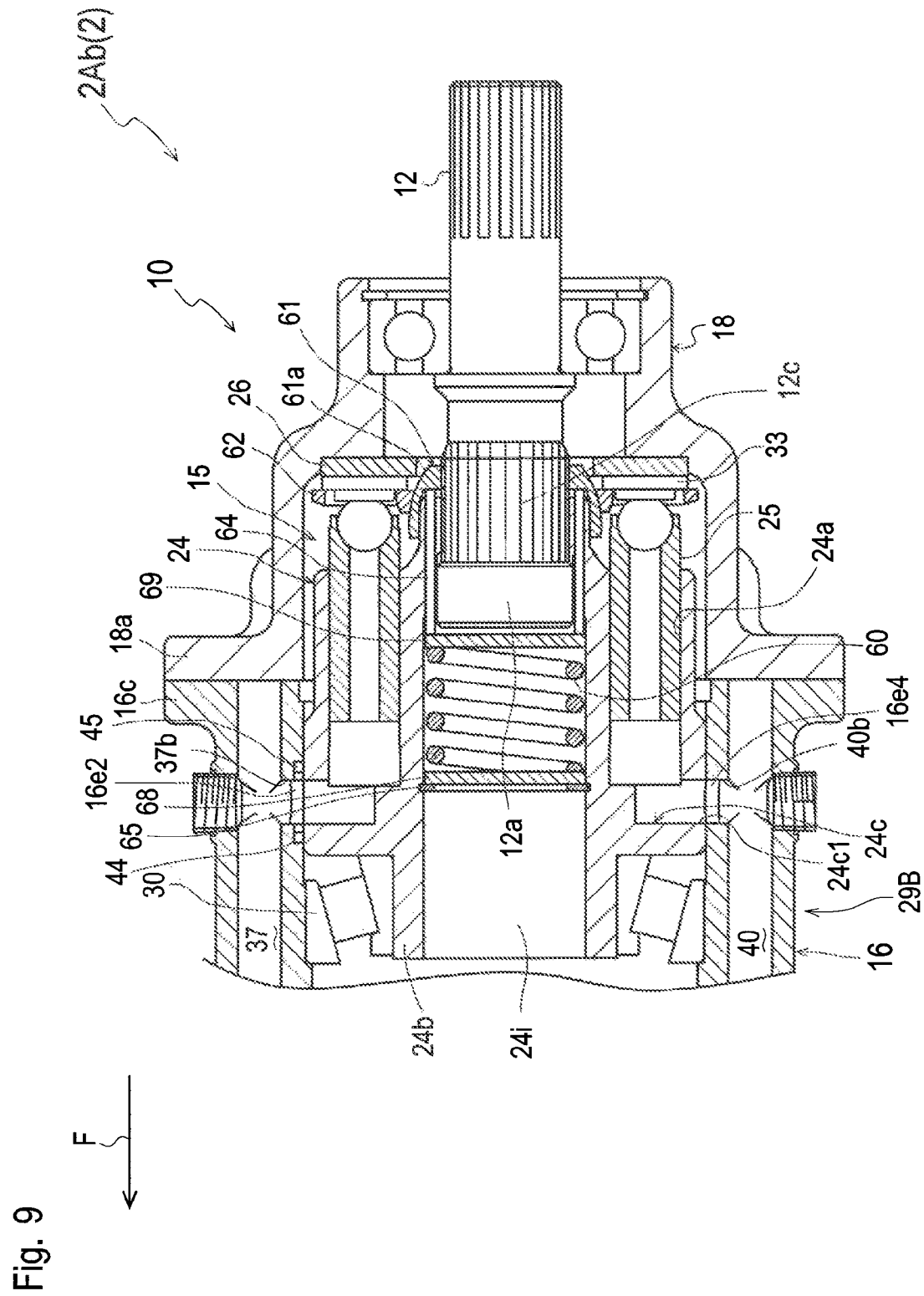
FIG. 9 is a fragmentary sectional plan view of an HST 2Ab serving as a second modification of HST 2A showing motor unit 10 of HST 2Ab.

Each of HST 2Aa shown in FIG. 8 as the first modification of HST 2A and HST 2Ab shown in FIG. 9 as the second modification of HST 2A uses taper roller bearings 30 to support plunger blocks 19 and 24 in center casing 16 similarly to HST 2A, however, HST 2Aa and HST 2Ab differ from HST 2A with regard to structure for supporting pump and motor shafts 11 and 12 and structure for biasing toward swash plates 21 and 26 by use of axial thrust forces. These different structures will be described. In this regard, FIGS. 8 and 9 illustrate only hydraulic motor 15 representing both hydraulic pump 14 and hydraulic motor 15. Only the representative structure of hydraulic motor 15 will be described on the assumption that hydraulic pump 14 is configured in the same way of hydraulic motor 15.

As shown in FIG. 8, in HST 2Aa, there is no spring 34 between each plunger 25 and the vertical end surface of each plunger chamber 24a. A spring 60 is wound around motor shaft 12 instead of springs 34. In this regard, in axial hole 24i, motor shaft 12 is formed with boss portion 12a for aligning the axis of motor shaft 12 and with spline portion 12c for engaging with plunger block 24. Boss portion 12a and spline portion 12c of motor shaft 12 in HST 2Aa are the reverse of those of motor shaft 12 in HST 2A in the fore-and-aft direction. More specifically, in HST 2Aa, the outer peripheral surface of boss portion 12a contacts the inner peripheral surface of small diameter portion 24b at the front end portion of plunger block 24 and spline portion 12c is spline-fitted to the rear end portion of the inner peripheral surface of plunger block 24. Axial extension portion 12b is extended between boss portion 12a and spline portion 12c. The portion of motor shaft 12 projecting outward from plunger block 24 is extended rearward from spline portion 12c.

A rear portion of spline portion 12c projects rearward to some extent from a rear end portion of a center boss portion of plunger block 24, i.e., from an end portion of plunger block 24 toward fixed swash plate 26. A retainer guide 61 is fitted onto this projecting portion of spline portion 12c unrotatably relative to motor shaft 12 so as to cover the rear end portion of the center boss portion of plunger block 24. A retainer 62 is slidably supported on a ball-shaped outer peripheral surface 61a of retainer guide 61. An outer peripheral portion of retainer 62 extended radially from its central portion supported on retainer guide 61 is disposed between shoes 33 and plungers 25.

Retainer stopper pins 64 are disposed in axial hole 24i so as to extend through the center boss portion of plunger block 24. Each of retainer stopper pins 64 abuts at one end thereof against a ring-shaped rear retaining member 67 axially slidably disposed in axial hole 24i and abuts at the other end thereof against retainer guide 61.

Further, in axial hole 24i, a ring-shaped front retaining member 66 is axially slidably disposed forward of rear retaining member 67. A retaining ring 65 is fixed to plunger block 24 in axial hole 24i so as to limit the forward slide of front retaining member 66. Spring 60 is wound around axial extension portion 12b of motor shaft 12 between front and rear retaining members 66 and 67. In other words, spring 60 is disposed coaxially to motor shaft 12 on an outer peripheral surface of motor shaft 12.

Spring 60 presses rear retaining member 67 toward fixed swash plate 26, thereby pressing retainer guide 61 toward fixed swash plate 26 via retainer stopper pins 64. The pressure of retainer guide 61 is transmitted to retainer 62 supported on retainer guide 61, thereby constantly pressing shoes 33 toward fixed swash plate 26. Unshown hydraulic pump unit 9 has the same structure for biasing shoes 32 toward movable swash plate 21.

Therefore, respective springs 60 wound around pump and motor shafts 11 and 12 press shoes 32 and 33 toward respective swash plates 21 and 26 so as to ensure the required proper movement of shoes 32 and 33 following swash plates 21 and 26. Springs 60 dispense with springs in plunger chambers 19a and 24a such as to hind smooth fluid flow in plunger chambers 19a and 24a. Consequently, especially when HST 2Aa is driven fast, the flow of fluid in plunger chambers 19a and 24a is smoothened so as to reduce lowering of the power transmission efficiency of HST 2Aa.

In HST 2Ab shown in FIG. 9, similar to HST 2Aa, springs 60 bias pump and motor shafts 11 and 12 toward swash plates 21 and 26 in place of springs 34 provided in respective, plunger chambers 19a and 24a. The difference of HST 2Ab from HST 2Aa is that the axial lengths of pump and motor shafts 11 and 12 are smaller than those of pump and motor shafts 11 and 12 in HST 2Aa and that springs 60 are disposed coaxially to pump and motor shafts 11 and 12 however are axially offset from pump and motor shafts 11 and 12.

As shown in FIG. 9, in HST 2Ab, the portion of motor shaft 12 disposed in axial hole 24i of plunger block 24 does not have axial extension portion 12b such as that of motor shaft 12 in HST 2Aa. This portion of motor shaft 12 in HST 2Ab is formed with spline portion 12c and boss portion 12a adjoining each other. Similar to spline portion 12c of HST 2Aa, spline portion 12c of HST 2Ab is spline-fitted to the front end portion of the inner peripheral surface of plunger block 24 and engages with retainer guide 61 covering the rear end portion of plunger block 24. On the other hand, boss portion 12a of HST 2Ab contacts the inner peripheral surface of plunger block 24 similarly to that of HST 2Aa, however, the axial position of boss portion 12a is disposed adjacently forward of spline portion 12c at the axial center portion of plunger block 24 in comparison with boss portion 12a of motor shaft 12 in HST 2Aa disposed in small diameter portion 24b at the front end portion of plunger block 24. In connection with the short portion of motor shaft 12 in plunger block 24, a discoid front retaining member 68 is disposed to contact a rear end surface of retaining ring 65, and a discoid rear retaining member 69 is disposed forward of a front end of motor shaft 12. Spring 60 is interposed between front and rear retaining members 68 and 69 so as to press rear retaining member 69 toward fixed swash plate 26.

In HST 2Ab, retainer stopper pins 64 are interposed between rear retaining member 69 and retainer guide 61, and retainer 62 supported on retainer guide 61 constantly presses shoes 33 toward fixed swash plate 26. Unshown hydraulic pump unit 9 in HST 2Ab has the similar structure.

Figure 17:
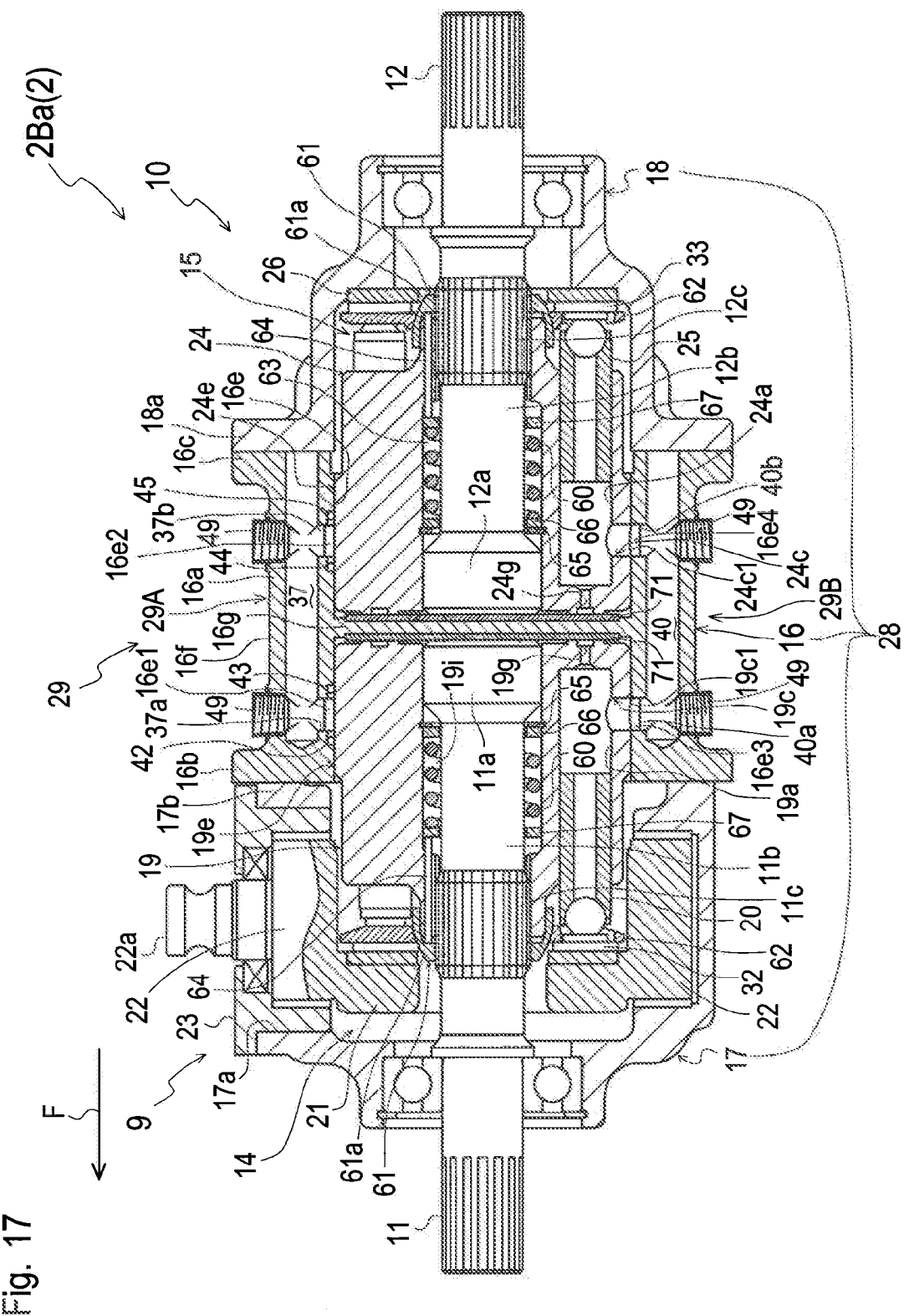
FIG. 17 is a fragmentary sectional plan view of an HST 2Ba serving as a modification of HST 2B showing motor unit 10 of HST 2Ba.

As shown in FIG. 10, HST 2B employs the structure of pump and motor shafts 11 and 12 and the structure for biasing shoes 32 and 33 toward swash plates 21 and 26, which are similar to those of HST 2Ab in which springs 60 are axially offset from pump shaft 11 and motor shaft 12 in respective axial holes 19i and 24i of plunger blocks 19 and 24. In HST 2Ba shown in FIG. 17 as a modification of HST 2B, sprigs 60 are wound around pump shaft 11 and motor shaft 12. FIG. 17 illustrates only representative hydraulic motor unit 10 on the assumption that unshown hydraulic pump unit 9 is similar to hydraulic motor unit 10.

As mentioned above, in each of HST 2Aa, 2Ab, 2B and 2Ba, the biasing forces of springs 60 disposed coaxially to pump and motor shafts 11 and 12 press shoes 32 and 33 contacting plungers 20 and 25 toward swash plates 21 and 26, thereby dispensing with springs 34 in plunger chambers 19a and 24a. Therefore, the fluid flow in plunger chambers 19a and 24a is smoothened so as to prevent reduction of the power transmission efficiency of the HST. Further, the number of parts and costs are reduced and maintenanceability is improved.

A structure for controlling pressure and flow of fluid in closed fluid circuit 29 of HST 2 provided with a valve unit 80 will be described with reference to FIGS. 18 to 22. In this regard, any of the above-mentioned embodiments of HST 2 is adaptable as HST 2 shown in FIGS. 18 to 22. Valve unit 80 includes a fluid duct block 81 incorporating a pair of charge check valves 82 and a pair of relief valves 83. Valve unit 80 is externally mounted onto HST 2, more specifically, fluid duct block 81 contacts a bottom surface of center casing 16 at a top surface thereof and is fixed to center casing 16, thereby integrating valve unit 80 with HST 2. The bottom surface of center casing 16 is provided as the position for mounting fluid duct block 81 because this is a convenient position for simply forming housing 28 with charge fluid ducts connected to main fluid passages 29A and 29B at even distances to main fluid passages 29A and 29B. However, fluid duct block 81 may be mounted on an alternative portion of HST 2, such as pump casing 17 or a right or left side surface of center casing 16.

Figure 18:
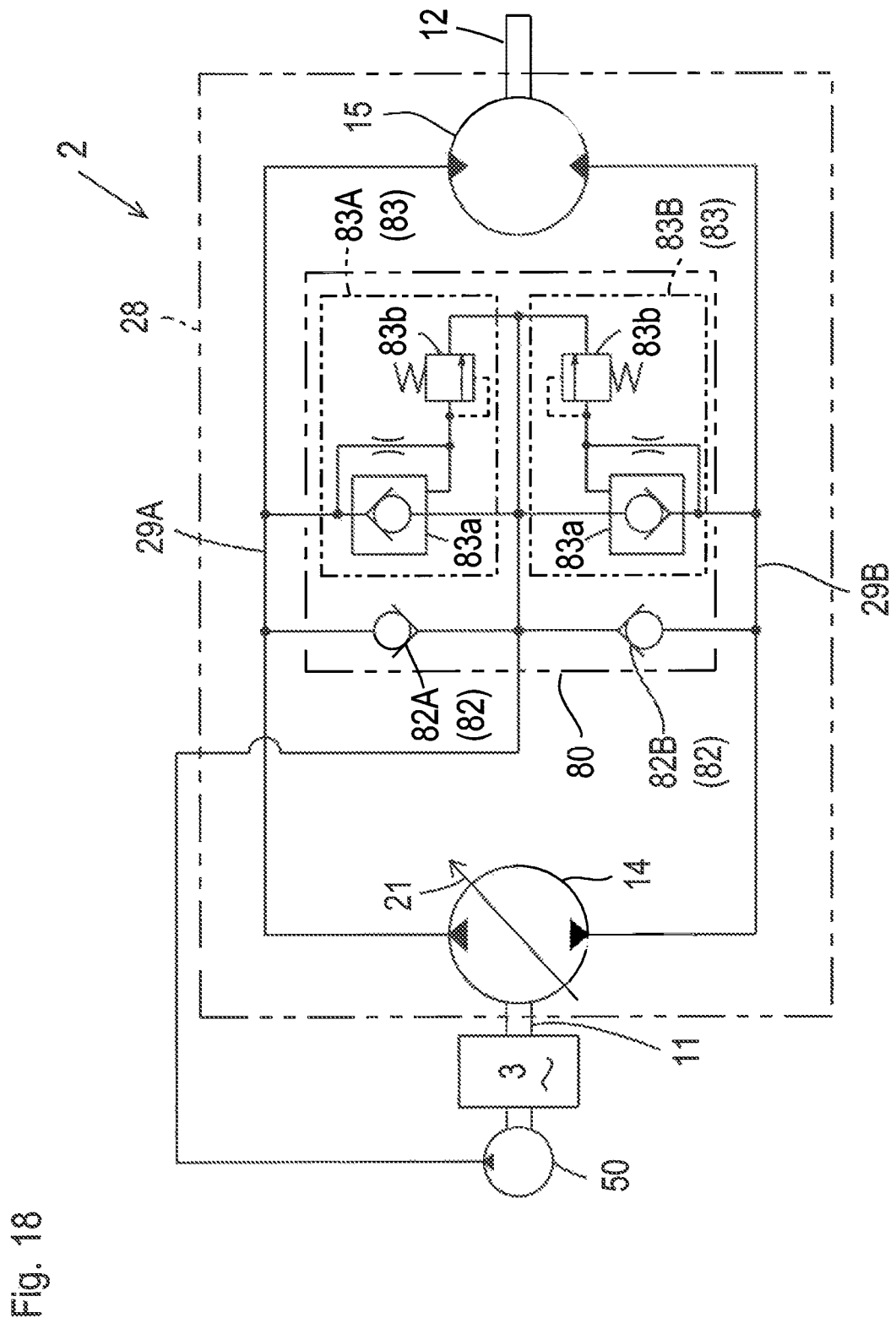
FIG. 18 is a hydraulic circuit diagram of a hydraulic fluid control system of HST 2 provided with a valve unit 80.

Fluid duct block 81 is shaped in a horizontally flat plate. A pump port 81a is open at a bottom surface of fluid duct block 81 so as to receive fluid delivered from a charge pump 50 driven by engine 3 as shown in FIG. 18. Pump port 81a is extended vertically upward, and right and left branching ports 81b and 81c are branched rightward and leftward from a top portion of pump port 81a. More specifically, a laterally horizontal fluid duct bore is joined at an intermediate portion thereof to the top of pump port 81a so that its right portion extended rightward from the junction to the top of pump port 81a serves as branching port 81b and its left portion extended leftward from the junction to the top of pump port 81a serves as branching port 81c. Right charge check valve 82 is fitted into fluid duct block 81 from the outside of a right side surface of fluid duct block 81 so as to coaxially face right branching port 81b. Left charge check valve 82 is fitted into fluid duct block 81 from the outside of a left side surface of fluid duct block 81 so as to coaxially face left branching port 81c.

As mentioned above, HST 2 is assumed to be configured so that first main fluid passage 29A which is higher-pressurized during forward traveling of vehicle 1 is disposed in the right side portion of center casing 16 and second main fluid passage 29B which is lower-pressurized during forward traveling of vehicle 1 is disposed in the left side portion of center casing 16. On this assumption, right charge check valve 82 serves as a first charge check valve 82A for supplementing fluid to first main fluid passage 29A and left charge check valve 82 serves as a second charge check valve 82B for supplementing fluid to second main fluid passage 29B. Charge ports 81d and 81e are extended upward from top portions of respective branching ports 81b and 81c facing delivery ports 82a of respective charge check valves 82 and are open at the top surface of fluid duct block 81.

Figure 21:
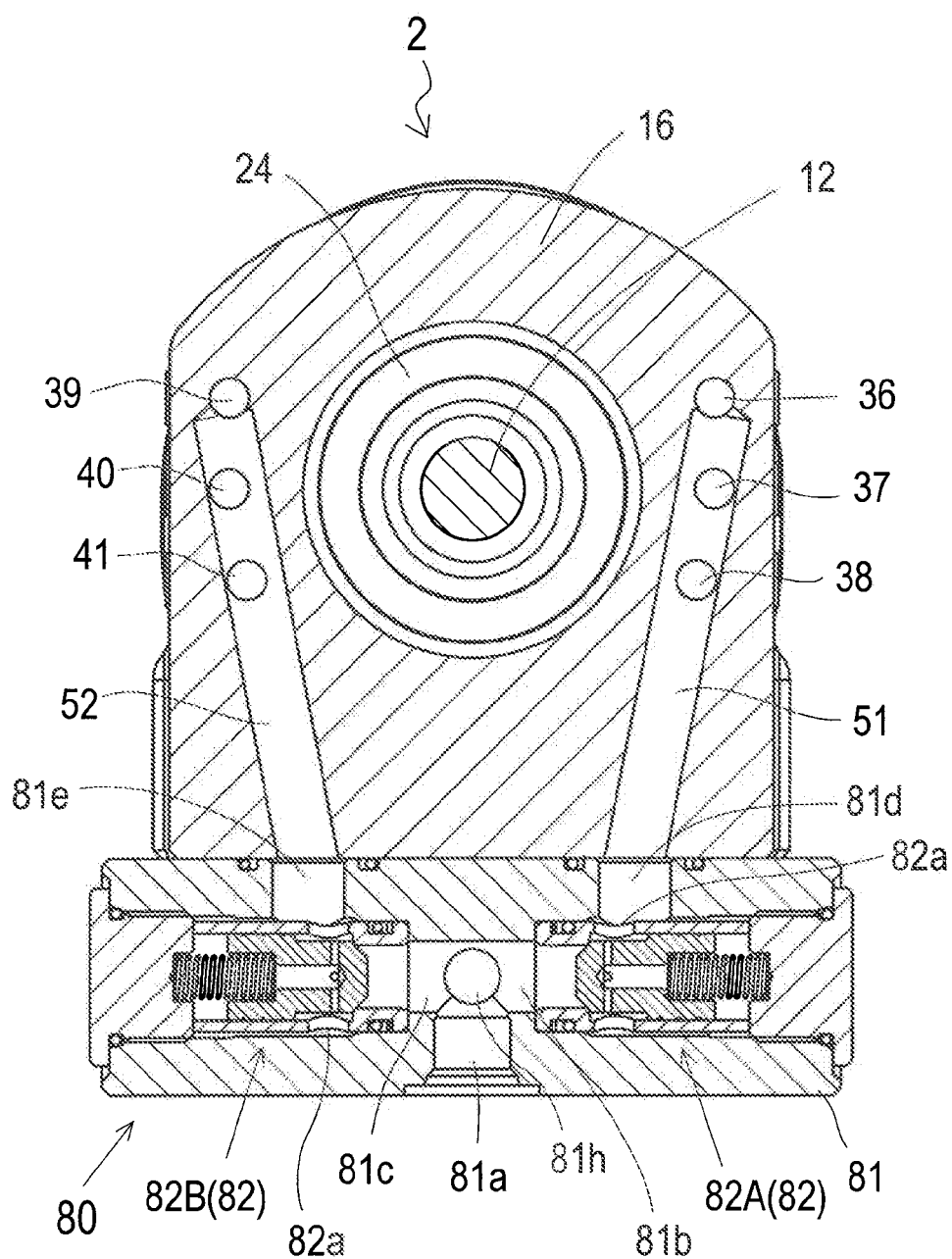
FIG. 21 is a cross sectional view taken along B-B line of FIG. 19.
Figure 22:
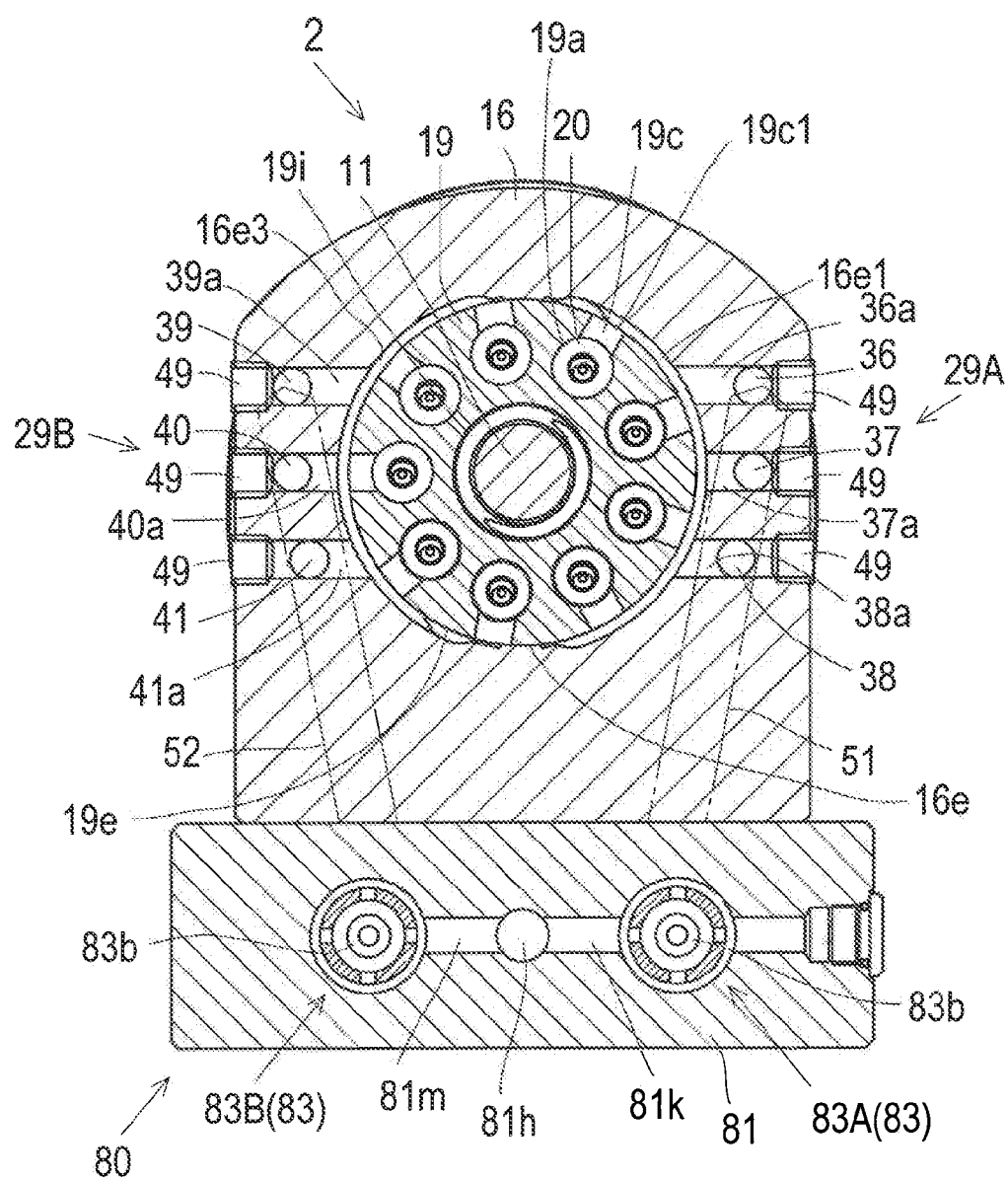
FIG. 22 is a cross sectional view taken along C-C line of FIG. 19.

As shown in FIGS. 21 and 22, a charge fluid duct 51 is formed in a right portion of center casing 16 and is joined at an upper portion thereof to intermediate portions of first encased fluid ducts 36, 37 and 38. A bottom end of charge fluid duct 51 is open at the bottom surface of center casing 16 so as to be joined to right charge port 81d open at the top surface of fluid duct block 81 attached to the bottom surface of center casing 16. On the other hand, a charge fluid duct 52 is formed in a left portion of center casing 16 and is joined at an upper portion thereof to intermediate portions of second encased fluid ducts 39, 40 and 41. A bottom end, of charge fluid duct 52 is open at the bottom surface of center casing 16 so as to be joined to left charge port 81e open at the top surface of fluid duct block 81 attached to the bottom surface of center casing 16. In this way, charge fluid duct 51 is interposed between first main fluid passage 29A and first charge check valve 82A, and charge fluid duct 52 is interposed between second main fluid passage 29B and second charge check valve 82B.

Referring to FIG. 18, fluid delivered from charge pump 50 is passed through an unshown charge relief valve so as to have a certain hydraulic pressure and is supplied to pump port 81a. In this condition, if one of first and second main fluid passages 29A and 29B is higher-pressurized and the other lower-pressurized because of change of the tilt direction of movable swash plate 21 or another reason, charge check valve 82 on the lower-pressurized side is open. For example, when first main fluid passage 29A is lower-pressurized, first charge check valve 82A is open so as to pass fluid from pump port 81a to its delivery port 82a and so as to deliver the fluid from its delivery port 82a to first encased fluid ducts 36, 37 and 38 of first main fluid passage 29A via charge fluid duct 51. Therefore, the flow amount of fluid circulating in closed fluid circuit 29 is regulated to prevent problems such as cavitation.

Right and left relief valves 83 are fitted into fluid duct block 81 from a rear end surface of fluid duct block 81. Right relief valve 83 serves as a first relief valve 83A for releasing excessively pressurized fluid from first main fluid passage 29A. Left relief valve 83 serves as a second relief valve 83B for releasing excessively pressurized fluid from second main fluid passage 29B. Relief valves 83 are connected to respective charge ports 81d and 81e. More specifically, a fore-and-aft horizontal relief duct 81f is joined at a front end thereof to a portion of charge port 81d between the top end of charge port 81d and delivery port 82a of first charge check valve 82A. A fore-and-aft horizontal relief duct 81g is joined at a front end thereof to a portion of charge port 81e between the top end of charge port 81e and delivery port 82a of second charge check valve 82B. Each relief valve 83 includes a pilot check valve 83a and a main relief valve 83b. Pilot check valve 83a is disposed so as to face corresponding delivery port 82a, and main relief valve 83b is disposed rearward of pilot check valve 83a.

Fluid duct block 81 is bored with a fore-and-aft horizontal drain fluid duct 81h between right and left relief valves 83A and 83B. A front end of drain fluid duct 81h is joined to the junction of branching ports 81b and 81c to pump port 81a. Right and left laterally horizontal pilot relief ports 81i and 81j are branched rightward and leftward from drain fluid duct 81h so as to be joined to respective delivery ports of pilot check valves 83a of relief valves 83A and 83B. Right and left laterally horizontal relief ports 81k and 81m are branched rightward and leftward from drain fluid duct 81h so as to be joined to respective delivery ports of main relief valves 83b of relief valves 83A and 83B.

For example, when first main fluid passage 29A is higher-pressurized, first charge check valve 82A is closed. The hydraulic pressure of fluid in first main fluid passage 29A is transmitted to delivery port 82a of first charge check valve 82A via first charge fluid duct 51 and charge port 81d so that the high-pressurized fluid is supplied to pilot check valve 83a of first relief valve 83A via relief duct 81f joined to delivery port 82a of first check valve 82A. This high-pressurized fluid is supplied to a backpressure chamber between pilot check valve 83a and main relief valve 83b via an orifice formed in pilot check valve 83a. Therefore, the hydraulic pressure rearward of pilot check valve 83a is equalized to the hydraulic pressure forward of pilot check valve 83a, and a spring in the backpressure chamber holds pilot check valve 83a closed. When the hydraulic pressure in the backpressure chamber, i.e., the backpressure, exceeds a threshold, the backpressure of fluid forcibly opens main relief valve 83b so that open main relief valve 83b receives fluid from the backpressure chamber and releases the fluid from its delivery port to drain fluid duct 81h via relief port 81k. Pilot check valve 83a is forcibly opened by the high-pressurized fluid from first main fluid passage 29A because main relief valve 83b is open so as to reduce the backpressure. This high-pressurized fluid is released from the delivery port of pilot check valve 83a to drain fluid duct 81h via pilot relief port 81i. Meanwhile, second charge check valve 82B is open to supply from drain fluid duct 81h to second main fluid passage 29B. Similarly, when first main fluid passage 29A is lower-pressurized and second main fluid passage 29B is higher-pressurized, main relief valve 83b and pilot check valve 83a in second relief valve 83 are open to release excessively pressurized fluid from second main fluid passage 29B to drain fluid duct 81h, and first charge check valve 82A is open to supply fluid from drain fluid duct 81h to lower-pressurized first main fluid passage 29A.

Therefore, relief valve 83 in valve unit 80 regulates hydraulic pressure of fluid in higher-pressurized main fluid passage 29A or 29B, and charge check valve 82 in valve unit 80 supplements the fluid drained from higher-pressurized main fluid passage 29A or 29B to lower-pressurized main fluid passage 29A or 29B, thereby preventing lack of fluid in closed fluid circuit 29.

The only required thing for valve unit 80 is to configure a hydraulic circuit system such as shown in FIG. 18 so as to realize the above-mentioned valve function. Arrangements of charge check valves 82 and relief valves 83 in fluid duct block 81 and of fluid ducts in fluid duct block 81 are not limited to the above-mentioned arrangements.

Figure 23:
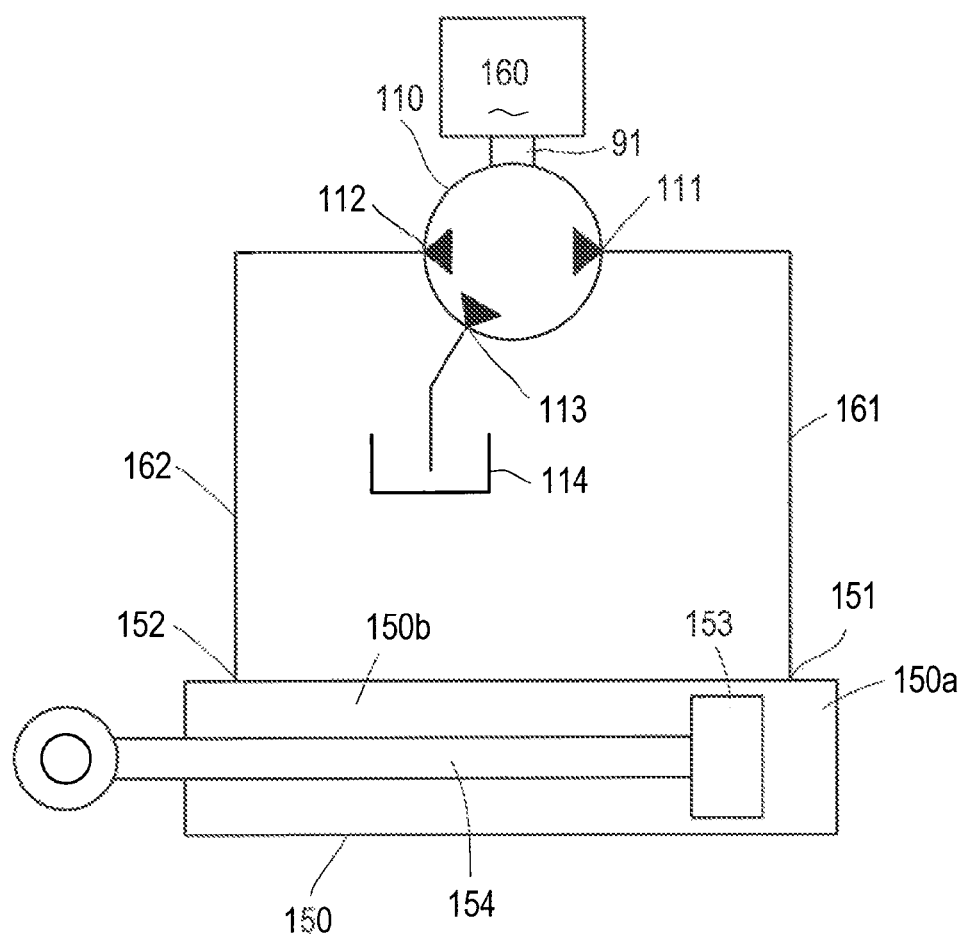
FIG. 23 is a hydraulic circuit diagram for controlling a hydraulic cylinder 150 using a hydraulic pump unit 90.

A hydraulic pump unit 90 shown in FIGS. 23 to 25 will be described. As shown in FIG. 23, for example, hydraulic pump unit 90 is driven by a rotation-reversible electric motor 160 so as to control a double-acting hydraulic cylinder 150 serving as a hydraulic actuator for raising and lowering a working implement attached to a tractor.

Hydraulic pump unit 90 has ports 111 and 112 for sucking and delivering fluid for operating hydraulic cylinder 150. A piston 153 partitions an inner space of hydraulic cylinder 150 into a first fluid chamber 150a and a second fluid chamber 150b. A piston rod 154 extended from piston 153 is not disposed in first fluid chamber 150a but is disposed in second fluid chamber 150b. Hydraulic cylinder 150 includes a first port 151 open to first fluid chamber 150a and includes a second port 152 open to second fluid chamber 150b. Port 111 of pump unit 90 is connected to port 151 of hydraulic cylinder 150 via a pipe or the like, and port 112 of pump unit 90 is connected to port 152 of hydraulic cylinder 150 via a pipe or the like. Further, hydraulic pump unit 90 is provided with a drain port 113 for draining fluid to a tank 114.

Hydraulic pump unit 90 includes a drive shaft 91, a plunger block 94, plungers 95, shoes 96, a swash plate 97 and a spring 98. These members are assembled together and are accommodated in a housing including housings 92 and 93 joined to each other, thereby constituting hydraulic pump unit 90. Drive shaft 91 is drivingly connected to electric motor 160. Plunger block 94 is fixed on drive shaft 91. Plungers 95 are fitted in plunger block 94. Swash plate 97 abuts against plungers 95 via respective shoes 96. Spring 98 presses shoes 96 on plungers 95 against swash plate 97.

Swash plate 90 is fixed so that hydraulic pump unit 90 has a fixed displacement. Hydraulic pump unit 90 basically employs some structures common to the above-mentioned embodiments of HST 2 and some structures peculiar to one of the above-mentioned embodiments of HST 2. In this regard, housing 93 functions similar to center casing 16 of HST 2. An inner peripheral surface of housing 93 faces an outer peripheral surface of plunger block 94 so as to provide a bearing gap between the inner peripheral surface of housing 93 and the outer peripheral surface of plunger block 94, thereby fluidly supporting plunger block 94. Plunger block 94 is supported by the fluidal support of the bearing gap without using a mechanical bearing. Therefore, preferably, plunger block 94 is desired to have two lines of dynamic pressure grooves 35 as shown in FIG. 14 rather than one line of dynamic pressure grooves 35 as shown in FIG. 5. Spring 98 is wound on an outer peripheral surface of drive shaft 91. However, the illustrated structures of hydraulic pump unit 90 are provided as an only example. Any structures adapted in the above-mentioned embodiments of HST 2 are adaptable to hydraulic pump unit 90. For example, plunger block 94 may be supported by taper roller bearing 30 as used in HST 2A.

To configure the fluid passages in hydraulic pump unit 90 from plunger chambers in plunger block 94 to ports 111 and 112, radial fluid ducts 94b are formed in plunger block 94 to extend radially from respective plunger chambers 94a and are open as respective plunger ports 94c at the outer peripheral surface of plunger block 94. Plunger ports 94c are peripherally aligned on plunger block 94.

A fluid passage 120 for fluidly connecting plunger ports 94c to port 111 and a fluid passage 130 for fluidly connecting plunger ports 94c to port 112 are formed laterally symmetrically in housings 92 and 93. On the assumption that the axis of drive shaft 91 is oriented in the fore-and-aft direction, ports 111 and 112 are distributed between left and right side ends of housing 92. In the positional relation shown in FIG. 25, fluid passage 120 is formed in housings 92 and 93 on the right side of plunger block 94, and fluid passage 130 is formed in housing 92 and 93 on the left side of plunger block 94.

To constitute fluid passage 120, a peripheral groove 121 is formed on a right portion of the inner peripheral surface of housing 93 so as to face plunger ports 94c, and upper, middle and lower branching fluid ducts 122, 123 and 124 are substantially horizontally extended from peripheral groove 121. Each of branching fluid ducts 122, 123 and 124 is extended rightward from peripheral groove 121, is bent in an L-shape and is extended forward into housing 92 joined to housing 93. A substantially vertical confluence duct 125 is bored in housing 92 so as to be joined to branching fluid ducts 122, 123 and 124, and a fluid duct 126 is extended rightward from confluence duct 125 to port 111.

Fluid passage 130 includes a peripheral groove 131, upper, middle and lower branching fluid ducts 132, 133 and 134, a confluence duct 135 and a fluid duct 136. Peripheral groove 131 is formed on a left portion of the inner peripheral surface of housing 93 so as to face plunger ports 94c. Three branching fluid ducts 132, 133 and 134 are substantially horizontally extended leftward from peripheral groove 131. Confluence duct 135 is formed in housing 92 and is joined to branching fluid ducts 132, 133 and 134. Fluid duct 126 is extended leftward from confluence duct 135 to port 112. When electric motor 160 rotates in one direction, port 111 becomes a delivery port, and port 112 becomes a suction port. When electric motor 160 rotates in the other direction, port 112 becomes a delivery port, and port 111 becomes a suction port.

A lower end of peripheral groove 121 is disposed at a low portion housing 93 adjacent to a lower end of the inner peripheral surface of housing 93 so as to have a peripheral length ranging a substantially half periphery of the inner peripheral surface of housing 93. In comparison with peripheral groove 121, a lower end of peripheral groove 131 is disposed at a position that is slightly lower than a left end of housing 93 and higher than the lower end of peripheral groove 121. Therefore, the peripheral length of peripheral groove 131 is smaller than that of peripheral groove 121.

Peripheral groove 131 is shorter than peripheral groove 121 because it is considered that fluid passage 120 and port 111 are fluidly connected to first fluid chamber 150a of hydraulic cylinder 150 while fluid passage 130 and port 112 are fluidly connected to second fluid chamber 150b of hydraulic cylinder 150. More specifically, since piston rod 154 is disposed in only second fluid chamber 150b, the change of volume of second fluid chamber 150b per unit movement of piston 153 is less than that of first fluid chamber 150a per unit movement of piston 153. The differential length between peripheral grooves 121 and 131 corresponds to the differential change rate of volume between fluid chambers 150a and 150b.

However, the capacity of fluid delivery of hydraulic pump unit 90 is constant regardless of whether electric motor 160 rotates in one direction or in the other direction. Therefore, a third peripheral groove 141 is provided to produce a differential fluid flow amount between ports 111 and 112. A fluid duct 142 is formed in housing 93 and a fluid duct 143 is formed in housing 93 so that peripheral groove 141 is fluidly connected to port 113 via fluid ducts 142 and 143. Port 113 is fluidly connected to tank 114.

In this regard, on the assumption that fluid passage 130 fluidly connected to second fluid chamber 150b of hydraulic cylinder 150 accommodating piston rod 154 is formed in left portions of housings 92 and 93, fluid passage 140 including peripheral groove 141 and fluid ducts 142 and 143 is formed in lower left portions of housings 92 and 93 out of the hydraulic function of fluid passage 130 so as to allow flow of fluid between plunger ports 94c and tank 114 that is independent of hydraulic cylinder 150. Therefore, during rotation of plunger block 94, the proper fluid suction and delivery action of each plunger 95 is ensured in all the rotational positions of each plunger 95.

As mentioned above, in consideration of the differential change rate of volume between fluid chambers 150a and 150b in hydraulic cylinder 150, hydraulic pump unit 90 used for supplying fluid to double-acting hydraulic cylinder 150 has asymmetric peripheral grooves 121 and 131 of respective fluid passages 120 and 130 and has third fluid passage 140 fluidly connected to tank 114 independent of hydraulic cylinder 150, thereby ensuring a smooth action of piston 153 in hydraulic cylinder 150. However, hydraulic pump unit 90 for a double-acting hydraulic actuator needs only a system functioning as above-mentioned fluid passages 120, 130 and 140 in this consideration. Therefore, hydraulic pump unit 90 may employ any other structure or arrangement than the above-mentioned structures and arrangements (e.g., any structure in any other one of the above-mentioned embodiments of HST 2) if it meets the above-mentioned requirement.

Figure 24:
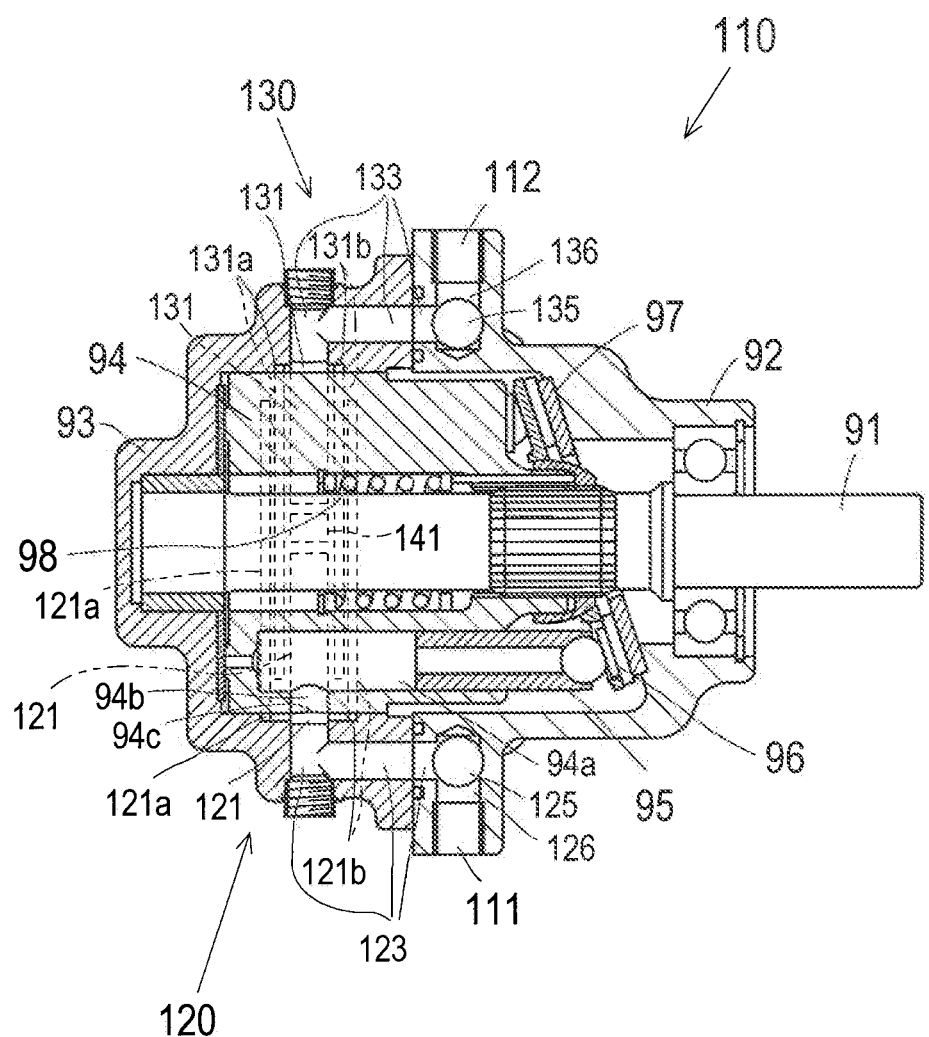
FIG. 24 is a sectional plan view of hydraulic pump unit 90.
Figure 25:
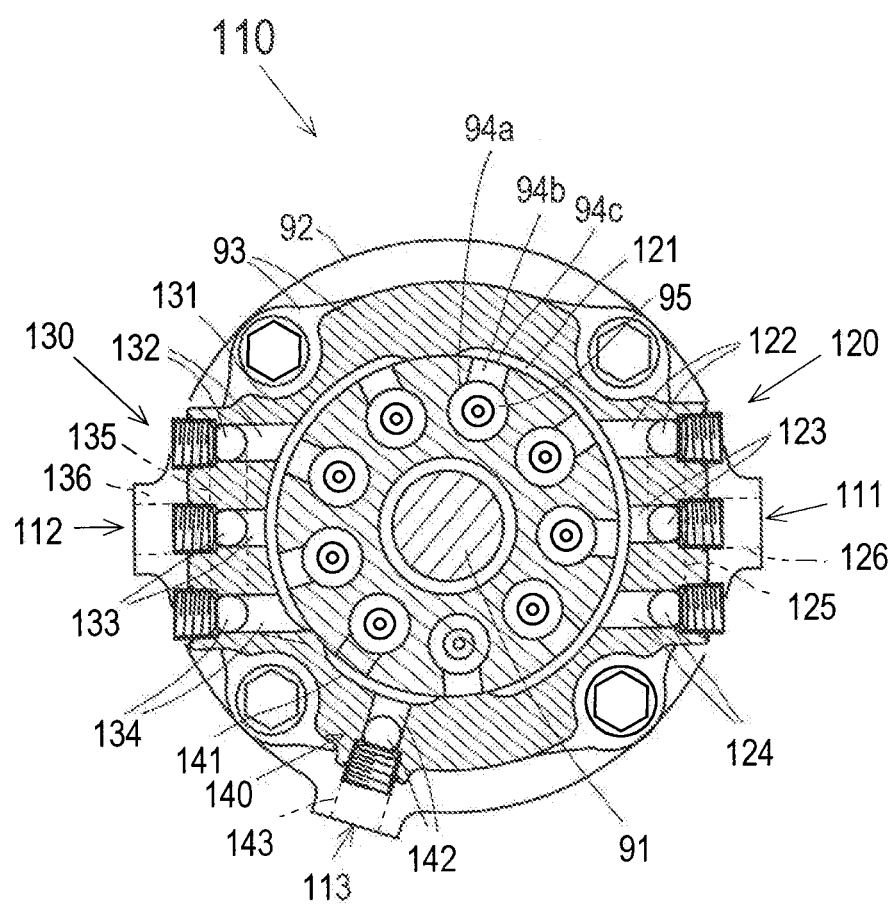
FIG. 25 is a sectional front view of hydraulic pump unit 90.

Further, as shown in FIG. 24, front and rear pressure balancing grooves 121a and 121b are branched from peripheral groove 121, and front and rear pressure balancing grooves 131a and 131b are branched from peripheral groove 131 in the same way of pressure balancing grooves 42, 43, 44 and 45 of HST 2. Pressure balancing grooves 121a and 121b branched from peripheral groove 121 in the right portion of housing 93 are extended to front and rear sides of peripheral groove 131 in the left portion of housing 93. Pressure balancing grooves 131a and 131b branched from peripheral groove 131 in the left portion of housing 93 are extended to front and rear sides of peripheral groove 121 in the right portion of housing 93. The distance of pressure balancing grooves 121a and 121b from peripheral groove 121 differs from the distance of pressure balancing grooves 131a and 131b from peripheral groove 131 so as to prevent pressure balancing grooves 121a and 121b from interfering with pressure balancing grooves 131a and 131b in the right and left lower portions of housing 93. Therefore, pressure balancing grooves 121a and 131a are extended in parallel at the front side of peripheral grooves 121 and 131, and pressure balancing grooves 121b and 131b are extended in parallel at the rear side of peripheral grooves 121 and 131.

What is claimed is:

1. A hydrostatic stepless transmission comprising:
   a hydraulic pump including an axial pump shaft, a first plunger block and plungers, wherein the first plunger block is fixed on the pump shaft so as to have an outer peripheral surface extending circumferentially and parallel to the pump shaft, and wherein the plungers of the hydraulic pump are axially reciprocally slidably fitted into respective plunger chambers formed in the first plunger block;
   a hydraulic motor including an axial motor shaft, a second plunger block and plungers, wherein the second plunger block is fixed on the motor shaft so as to have an outer peripheral surface extending circumferentially and parallel to the motor shaft, and wherein the plungers of the hydraulic motor are axially reciprocally slidably fitted into respective plunger chambers formed in the second plunger block;
   a closed fluid circuit fluidly connecting the hydraulic pump to the hydraulic motor, wherein the closed fluid circuit includes first and second main fluid passages interposed between the hydraulic pump and the hydraulic motor; and
   a center casing into which the first and second plunger blocks are inserted so that the center casing includes an inner peripheral surface facing the outer peripheral surfaces of the respective first and second plunger blocks,
   wherein plunger ports are formed in each of the first and second plunger blocks so as to be connected to the respective plunger chambers and so as to be open at the outer peripheral surface of each of the first and second plunger blocks, and
   wherein each of the first and second main fluid passages includes a pair of peripheral grooves and an encased fluid duct connecting the peripheral grooves to each other, whereby the peripheral grooves are formed on the inner peripheral surface of the center casing so as to face the respective outer peripheral surfaces of the respective first and second plunger blocks, and whereby the encased fluid duct is formed in the center casing so as to be fluidly connected to the respective plunger ports of the respective first and second plunger blocks via the respective peripheral grooves.

2. The hydrostatic stepless transmission according to claim 1, further comprising:
   a bearing gap causing an action of dynamic pressure of fluid,
   wherein the bearing gap is provided between the inner peripheral surface of the center casing and the outer peripheral surface of each of the first and second plunger blocks so that the center casing fluidly supports the first and second plunger blocks.

3. The hydrostatic stepless transmission according to claim 2, further comprising;
   a dynamic pressure groove provided on at least one of the outer peripheral surfaces of the first and second plunger blocks and the inner peripheral surface of the center casing so as to provide the bearing gap.

4. The hydrostatic stepless transmission according to claim 1, further comprising:
   a partition provided in the center casing between the first and second plunger blocks,
   wherein end portions of the respective first and second plunger blocks toward the partition are provided with respective openings at end surfaces thereof facing the partition so as to supply pressurized fluid from the plunger chambers onto the partition.

5. The hydrostatic stepless transmission according to claim 1, further comprising:
   a bearing interposed between the center casing and at least one of the first and second plunger blocks so as to correspond to radial and thrust forces generated in the at least one of the first and second blocks.

6. The hydrostatic stepless transmission according to claim 1,
   wherein during a normal rotation of the motor shaft, the first main fluid passage is higher-pressurized and the second main fluid passage is lower-pressurized, and
   wherein a pressure balancing groove is branched from at least one of the peripheral grooves of the first main fluid passage so as to extend adjacent to at least one of the peripheral grooves of the second main fluid passage.

7. The hydrostatic stepless transmission according to claim 1, further comprising:
   shoes provided on tips of the respective plungers projecting from the first and second plunger blocks and contacting a swash plate of the hydraulic pump and a swash plate of the hydraulic motor, respectively; and
   a spring disposed coaxially to each of the pump shaft and the motor shaft so that the shoes are pressed against each of the swash plates by a biasing force of the spring.

8. The hydrostatic stepless transmission according to claim 1, further comprising:
   a valve unit including a fluid duct block, a pair of charge check valves for supplying fluid to the respective first and second main fluid passages, and a pair of relief valves for draining excessively pressurized fluid from the higher-pressurized first or second main fluid passage,
   wherein the fluid duct block incorporates the pair of charge check valves and the pair of relief valves.

9. The hydrostatic stepless transmission according to claim 8,
   wherein in the center casing, a pair of charge fluid ducts are bored to be connected to the respective encased fluid ducts of the respective first and second main fluid passages,
   wherein in the fluid duct block, a pair of charge ports are provided to be connected to delivery ports of the respective charge check valves, and wherein the charge ports are connected to the respective charge fluid ducts by attaching the fluid duct block to the center casing.

10. The hydrostatic stepless transmission according to claim 9,
wherein in the fluid duct block, each of the relief valves is connected to each of the charge ports so that the relief valve corresponding to the higher-pressurized first or second main fluid passage absorbs fluid from the higher-pressurized first or second main fluid passage via the corresponding charge port and is opened by operating the fluid as a pilot pressure to drain excessively pressurized fluid from the higher-pressurized first or second main fluid passage.

11. The hydrostatic stepless transmission according to claim 1,
wherein the center casing is cylindrical so that the first and second plunger blocks are inserted into the center casing so as to continue to each other so that the pump shaft and the motor shaft are disposed coaxially to each other.

12. The hydrostatic stepless transmission according to claim 1,
wherein at least one of the encased fluid ducts of the respective first and second main fluid passages is extended in an axial direction of at least one of the pump shall and the motor shaft.

* * * * *